(12) United States Patent
Inazumi

(10) Patent No.: US 7,907,790 B2
(45) Date of Patent: Mar. 15, 2011

(54) IMAGE CORRECTING APPARATUS, PROJECTION SYSTEM, IMAGE CORRECTING METHOD, AND IMAGE CORRECTING PROGRAM

(75) Inventor: Mitsuhiro Inazumi, Shiojiri (JP)

(73) Assignee: Seiko Epson Corporation, Tokyo (JP)

( * ) Notice: Subject to any disclaimer, the term of this patent is extended or adjusted under 35 U.S.C. 154(b) by 875 days.

(21) Appl. No.: 11/842,428

(22) Filed: Aug. 21, 2007

(65) Prior Publication Data

US 2008/0100806 A1 May 1, 2008

(30) Foreign Application Priority Data

Nov. 1, 2006 (JP) ................................. 2006-298007

(51) Int. Cl.
*G06K 9/40* (2006.01)
*G03B 21/26* (2006.01)

(52) U.S. Cl. ......................................... 382/274; 353/30
(58) Field of Classification Search .................. 382/274; 353/30
See application file for complete search history.

(56) References Cited

U.S. PATENT DOCUMENTS

| | | | | |
|---|---|---|---|---|
| 5,305,430 A * | 4/1994 | Glassner | | 345/427 |
| 6,115,022 A * | 9/2000 | Mayer et al. | | 345/418 |
| 6,259,426 B1 * | 7/2001 | Harada et al. | | 345/581 |
| 6,781,563 B2 * | 8/2004 | Nishio et al. | | 345/1.1 |
| 7,097,311 B2 * | 8/2006 | Jaynes et al. | | 353/122 |
| 7,270,426 B2 * | 9/2007 | Miyazawa | | 353/94 |
| 7,489,814 B2 * | 2/2009 | Spitzer et al. | | 382/167 |
| 7,663,640 B2 * | 2/2010 | Nayar et al. | | 345/589 |
| 7,717,574 B1 * | 5/2010 | Lundback et al. | | 353/121 |
| 2001/0026645 A1 * | 10/2001 | Hiramatsu | | 382/291 |
| 2002/0054275 A1 * | 5/2002 | Yamanaka | | 353/30 |
| 2003/0052890 A1 * | 3/2003 | Raskar et al. | | 345/581 |
| 2003/0128337 A1 * | 7/2003 | Jaynes et al. | | 353/30 |
| 2004/0056858 A1 * | 3/2004 | Ohba et al. | | 345/419 |
| 2004/0184667 A1 * | 9/2004 | Raskar et al. | | 382/254 |
| 2004/0239885 A1 * | 12/2004 | Jaynes et al. | | 353/30 |
| 2004/0246495 A1 * | 12/2004 | Abe | | 356/603 |
| 2006/0210145 A1 * | 9/2006 | Lee et al. | | 382/154 |
| 2008/0204663 A1 * | 8/2008 | Balogh | | 353/10 |

FOREIGN PATENT DOCUMENTS

JP A 2006-165949 6/2006

* cited by examiner

*Primary Examiner* — Vikkram Bali
*Assistant Examiner* — Michelle Entezari
(74) *Attorney, Agent, or Firm* — Oliff & Berridge, PLC

(57) ABSTRACT

An image correcting apparatus is used in a projection system which includes a plurality of projectors installed away from each other. Respective projection images projected by the plural projectors are stacked on a projection surface. The image correcting apparatus includes a reference image pickup device to output a reference image, a plurality of detection image pickup devices to output a detection image, and a correction control device which controls operations of the reference image pickup device and the plural detection image pickup devices. The correction control device includes a plurality of shadow area judging units which judges a shadow area generated on a projection image based on a detection image and a reference image, and a plurality of shadow correction parameter producing units which gives weights to the shadow area and the non-shadow area to produce shadow correction parameter containing luminance correction weight information.

10 Claims, 18 Drawing Sheets

IMAGE CORRECTING APPARATUS, PROJECTION SYSTEM, IMAGE CORRECTING METHOD, AND IMAGE CORRECTING PROGRAM

BACKGROUND

1. Technical Field

The present invention relates to an image correcting apparatus, a projection system, an image correcting method, an image correcting program, and a recording medium.

2. Related Art

In order to display an image on a large screen, a projector in related art forms an image by modulating light emitted from a light source according to image information, and projects the image on a projection surface of a screen to display a projection image thereon. For a large screen, a projection system in related art employs a plurality of projectors and stacks respective projection images protected by the respective projectors and displays a composed projection image on the projection surface to obtain an image having high resolution and high luminance (for example, see JP-A-2006-165949).

The projection system according to JP-A-2006-165949 is of front projection type which has respective projectors on the audience side where a composed projection image is observed by the audience, using a reflection-type screen on which incident light is reflected to display the image.

When the composed projection image is displayed by the front projection type projector such as the projection system disclosed in JP-A-2006-165949, an obstacle such as audience often lies on a projection optical path between the projector and the projection surface at the time of display of a composed projection image.

When the obstacle exists on the projection optical path between the projector and the projection surface, the obstacle blocks a part of the projected image, producing shadow on a part of the composed projection image.

SUMMARY

It is an advantage of some aspects of the invention to provide an image correcting apparatus, a projection system, an image correcting method, an image correcting program, and a recording medium, which can reduce degradation of a composed projection image caused by shadow through image correction by the projector.

An image correcting apparatus according to a first aspect of the invention is used in a projection system which includes a plurality of projectors installed away from each other, each of which projectors modulates light emitted from a light source according to image information, and projects the modulated image on a projection surface to display a projection image. The respective projection images projected by the plural projectors are stacked to display a composed projection image on the projection surface. The projectors correct the image by operation of the image correcting apparatus. The image correcting apparatus includes a reference image pickup device disposed at a chief audience position for observing the composed projection image to obtain an image of the projection surface on which the composed projection image is displayed and output a reference image, a plurality of detection image pickup devices each of which is disposed close to the corresponding one of the plural projectors to obtain a image of the projection surface in the same direction as the projection direction of the corresponding projector and output a detection image, and a correction control device which controls operations of the reference image pickup device and the plural detection image pickup devices. The correction control device includes a plurality of shadow area judging units each of which is provided on the corresponding one of the plural projectors and judges a shadow area generated on a protection image projected, by the projector other than the correction target projector of the plural projectors and displayed on the projection surface based on a detection image obtained by the detection image pickup device disposed close to the correction target projector as a target of image correction and a reference image obtained by the reference image pickup device, and a plurality of shadow correction parameter producing units each of which is provided on the corresponding one of the plural projectors and gives weights to the shadow area and the non-shadow area other than the shadow area to produce shadow correction parameter containing luminance correction weight information based on which the correction target projector corrects luminance of areas corresponding to the shadow area and the non-shadow area in the image according to the weights.

The image correcting apparatus may be a device separated from the projectors. Alternatively, a part of the image correcting apparatus may be incorporated in the control structure inside each of the projectors. In case of the image correcting apparatus a part of which is incorporated in the control structure inside each of the projectors, the structure is as follows.

The shadow area judging unit and the shadow correction parameter producing unit designating a predetermined projector as the correction target in the plural shadow area judging units and plural shadow correction parameter producing units in the correction control device included in the image correcting apparatus are incorporated in the control structure inside the projector. That is, the shadow area judging unit and the shadow correction parameter producing unit are incorporated in the control structure inside each of the projectors.

According to this aspect of the invention, the image correcting apparatus includes the reference image pickup device, the plural detection image pickup devices, the plural shadow area judging units, and the plural shadow correction parameter producing units. Thus, degradation of the composed protection image caused by shadow can be prevented by image correction by the correction target projector in the following manner.

For simplifying the explanation, the following conditions are assumed. The projection system uses two projectors. An obstacle such as an audience lies on the projection optical path between one of the projectors and the projection surface. The obstacle blocks a part of an image projected by this projector, thereby producing shadow on the composed projection image. The obstacle does not block an image projected by the other projector. The obstacle does not exist on the camera vision of the reference image pickup device.

The shadow area judging unit and the shadow correction parameter producing unit designating the other projector (correction target projector) as the correction target in the two shadow area judging units and the two shadow correction parameter producing units constituting the correction control device operate in the following manner.

Initially, the shadow area judging unit judges a shadow area generated on a projection image projected by the one projector and displayed on the projection surface based on a detection image obtained by the detection image pickup device located close to the other projector and a reference image obtained by the reference image pickup device (shadow area judging step).

Then, the shadow correction parameter producing unit gives weights to the shadow area and the non-shadow area other than the shadow area and produces shadow correction parameter containing luminance correction weight information based on which the other projector corrects luminance of areas corresponding to the shadow area and the non-shadow area in the image according to the weights (shadow correction parameter producing step).

Subsequently, the other projector corrects luminance of the image to be formed based on the shadow correction parameter to execute shadow correction process for increasing luminance of the area corresponding to the shadow area higher than luminance of the area corresponding to the non-shadow area, for example.

As described above, the image correcting apparatus produces the shadow correction parameter, and the other projector corrects luminance based on the shadow correction parameter. Thus, the shadow generated on the projection image projected by the one projector and displayed on the projection surface becomes inconspicuous by the projection image projected by the other projector, thereby preventing degradation of the composed protection image caused by the shadow.

The shadow area judging unit and the shadow correction parameter producing unit designating the one projector (correction target projector) as the correction target in the two shadow area judging units and the two shadow correction parameter producing units constituting the correction control device operate in the following manner.

Initially, the shadow area judging unit judges a shadow area generated on a projection image projected by the other projector and displayed on the projection surface based on a detection image obtained by the detection image pickup device located close to the one projector and a reference image obtained by the reference image pickup device (shadow area judging step). In this case, the obstacle does not block the image from the other projector as explained above. Thus, the shadow area judging unit judges that no shadow area exists.

Then, the shadow correction parameter producing unit gives weights to the shadow area and the non-shadow area other than the shadow area and produces shadow correction parameter containing luminance correction weight information based on which the one projector corrects luminance of areas corresponding to the shadow area and the non-shadow area in the image according to the weights (shadow correction parameter producing step). In this case, since the shadow area judging unit has determined that no shadow area exists as mentioned above, the shadow correction parameter producing unit produces shadow correction parameter containing luminance correction weight information which sets predetermined weight for the entire area (non-shadow area).

Subsequently, the one projector performs shadow correcting process for correcting luminance of the entire area in the image to be formed according to the weight based on the shadow correction parameter.

Since the obstacle lies on the projection optical path between the one projector and the projection surfacer the obstacle also exists on the camera vision of the detection image pickup device disposed close to the one projector. As a result, a "false shadow area" generated only by the presence of the obstacle lying on the camera vision and blocking the projection surface. When the shadow area judging unit judges the shadow area based only on the detection image obtained by the detection image pickup device, for example, the shadow area judging unit determines the "false shadow area" as the shadow area. In this case, the shadow correction parameter producing unit produces shadow correction parameter for correcting luminance of the "false shadow area", and the one projector performs unnecessary shadow correcting process for increasing luminance of the area corresponding to the "false shadow area" higher than luminance of the other area, for example.

According to this aspect of the invention, however, the shadow area judging unit judges the shadow area based on both the reference image obtained by the reference image pickup device disposed at a chief audience position and the detection image obtained by the detection image pickup device disposed close to the correction target projector (the one projector in this example). In this case, the "false shadow area" lies in the detection image but does not exist in the reference image obtained by the reference image pickup device disposed at a position different from the position of the detection image pickup device. Since judgment of the shadow area is made based on both the detection image and the reference image, the possibility that the "false shadow area" is judged as the shadow area is eliminated. Accordingly, the shadow correction parameter producing unit can produce highly accurate shadow correction parameter reducing possibility of unnecessary shadow correcting process to be executed by the one projector.

According to this aspect of the invention, the shadow area judging unit and the shadow correction parameter producing unit are provided on each of the plural projectors. Thus, even when the obstacle is located at a position different from the position mentioned above, degradation of the composed projection image caused by shadow can be prevented.

According to the first aspect of the invention, it is preferable that the shadow area judging unit includes: a reference image binary data producing section which produces reference image binary data containing two values for large luminance and small luminance for each pixel in the reference image; a detection image binary data producing section which produces detection image binary data containing two values for large luminance and small luminance for each pixel in the detection image; and an area judging section which calculates the theoretical sum or theoretical product of the reference image binary data and the detection image binary data for each pair of corresponding pixels and produces judging image data for judging the shadow area to judge the shadow area based on the judging image data.

A "true shadow area" generated on the projection surface by the presence of the obstacle which blocks a part of the image projected by the one projector exists at the same positions of both the reference image obtained by the reference image pickup device and the detection image obtained by the detection image pickup device disposed close to the other projector. Since the shadow area judging unit designating the other projector as the correction target has the reference image binary data producing section, the detection image binary data producing section, and the area judging section, the shadow area judging unit calculates the theoretical sum or theoretical product of the reference image binary data containing two values for the reference image and the detection image binary data containing two values for the detection image for each pair of corresponding pixels to leave the "true shadow area" in the judging image corresponding to the judging data for appropriate judgment of the shadow area.

The "false shadow area" exists on the detection image obtained by the detection image pickup device disposed close to the one projector but does not exist on the reference image obtained by the reference image pickup device disposed at a position different from the position of the detection image pickup device. Since the shadow area judging unit designating the one projector as the correction target has the reference image binary data producing section, the detection image binary data producing section, and the area judging section, the shadow area judging unit calculates the theoretical sum or theoretical product of the reference image binary data containing two values for the reference image and the detection image binary data containing two values for the detection image for each corresponding pair of pixels to delete the "false shadow area" from the judging image corresponding to the judging image data for appropriate judgment that no shadow area exists.

Accordingly, the shadow area judging unit can easily and promptly distinguish between the "true shadow area", and the "false shadow area" and judges only the "true shadow area" as the shadow area.

According to the first aspect of the invention, it is preferable that the shadow correction parameter producing unit establishes an area containing the shadow area as a correction area and an area other than the correction area as the non-shadow area, and gradually changes the weight of a correction shadow area other than the shadow area in the correction area from the weight of the shadow area to the weight of the non-shadow area as the position of the weight shifts from the shadow area to the non-shadow area to produce shadow correction parameter containing the luminance correction weight information for correcting luminance of the areas corresponding to the shadow area, the correction shadow area, and the non-shadow area.

When the shadow correction parameter producing unit produces shadow correction parameter containing luminance correction weight information for setting weight only for the shadow area and the area other than the shadow area so that the correction target projector can perform the shadow correction process based on the shadow correction parameter, for example, luminance of the area corresponding to the shadow area differs from luminance of the area corresponding to the area other than the shadow area. In this case, the boundary between these areas becomes conspicuous, and thus appropriate prevention of degradation of the composed projection image is difficult.

According to this structure, the shadow correction parameter producing unit establishes weight for each of the shadow area, correction shadow area, and non-shadow area, and produces shadow correction parameter containing luminance correction weight information which gradually changes from the weight of the shadow area to the weight of the non-shadow area as the position of the weight shifts from the shadow area to the non-shadow area. Since the other projector executes the shadow correction process based on the shadow correction parameter thus determined, luminance on the boundary between the area corresponding to the shadow area and the area corresponding to the non-shadow area gradually changes. As a result, the boundary becomes inconspicuous, thereby appropriately avoiding degradation of the composed projection image.

According to the first aspect of the invention, it is preferable that the shadow correction parameter producing unit includes: a luminance correction weight information producing section which produces the luminance correction weight information; a luminance complementary weight information producing section which produces luminance complementary weight information obtained by reversing the luminance correction weight information on the basis of the weight of the non-shadow area; and a weight information combining section which combines the luminance complementary weight information produced by the luminance complementary weight information producing section of the other shadow correction parameter producing unit and the luminance correction weight information produced by the luminance correction weight information producing section of the shadow correction parameter producing unit to create the shadow correction parameter.

The shadow area judged by the shadow area judging unit designating the other projector as the correction target corresponds to the area of the image released from the one projector and blocked by the obstacle. In this structure, the shadow correction parameter producing unit has the luminance correction weight information producing section, the luminance complementary weight information producing section, and the weight information combining section. The shadow correction parameter producing unit designating the one projector as the correction target combines the luminance correction weight information produced by the luminance correction weight information producing section, and the luminance complementary weight information produced by the luminance complementary weight information producing section of the shadow correction parameter producing unit designating the other projector as the correction target, that is, the information containing weight for decreasing the luminance of the area corresponding to the shadow area lower than the luminance of the area corresponding to the non-shadow area to produce the shadow correction parameter. Since the one projector executes the shadow correcting process based on this shadow correction parameter, the luminance of the area corresponding to the shadow area, that is, the luminance of the area of the image released from the one projector and applied to the obstacle becomes lower than the luminance of the other area. As a result, a part of the image from the one projector is not reflected by the obstacle, and the object is not dazzled by the light of the one projector when the object is an audience.

According to the first aspect of the invention, it is preferable that a plurality of invisible light emitting devices each of which is disposed close to the corresponding one of the plural projectors to emit light in an invisible region toward the projection surface in the same direction as the projection direction of image from the corresponding projector are provided. In this case, the reference image pickup device and the plural detection image pickup devices detect light emitted from the invisible light emitting devices and reflected by the projection surface.

In this structure, the image correcting apparatus has the plural invisible light emitting devices. The reference image pickup device and the plural detection image pickup devices detect light emitted from the invisible light emitting devices and reflected by the projection surface. For example, by detecting invisible light emitted from the invisible light emitting device disposed close to the one projector, the reference image pickup device disposed at the chief audience position and the detection image pickup device disposed close to the other projector can virtually obtain the projection image projected on the projection surface by the one projector. On the other hand, by detecting invisible light emitted from the invisible light emitting device disposed close to the other projector, the reference image pickup device disposed at the chief audience position and the detection image pickup device disposed close to the one projector can virtually obtain the projection image projected on the projection surface by the other projector. This structure eliminates the necessity for controlling the respective projectors such that the projectors can display predetermined projection images (for example, projection images all pixels of which have the same gradation value (luminance value)) for the shadow area judging process performed by the shadow area judging unit. Thus, simplification of the control structure improves. It is also possible to execute the shadow area judging step and the shadow correction parameter producing step with protection images (projection images to be seen by the audience) displayed by the respective projectors by using the respective invisible light emitting devices.

According to the first aspect of the invention, it is preferable that the plural projectors are projectors capable of switching images of red, green and blue with time-sharing system, and displaying images of different colors for each projector in a monochromatic display period for displaying monochromatic image. In this case, the shadow area judging unit includes: a reference image dividing section which divides a reference image obtained by the reference image pickup device in the monochromatic display period in synchronization with display timing of each of the projectors for displaying the respective colors; a reference difference image producing section which calculates the difference between the reference image divided by the reference image dividing section and an image corresponding to the display color displayed by the correction target projector in the monochromatic display period and creates reference difference image; a detection image dividing section which divides a detection image obtained by the detection image pickup device disposed close to the correction target projector in the monochromatic display period in synchronization with display timing of each of the projectors for displaying the respective colors; and a detection difference image producing section which calculates the difference between the detection image divided by the detection image dividing section and an image corresponding to the display color displayed by the correction target projector in the monochromatic display period and creates detection difference image. In this case, the shadow area judging unit judges a shadow area generated on a projection image projected by any of the plural projectors other than the correction target projector and displayed on the projection surface based on the reference difference image and the detection difference image.

In this structure, the plural projectors display images of respective colors with time-sharing system such that images of different colors for each projector can be displayed in the monochromatic display period. The shadow area judging unit has the reference image dividing section, the reference difference image producing section, the detection image dividing section, and the detection difference image producing section. In this case, for example, the reference difference image producing section of the shadow area judging unit designating the one projector as the correction target calculates the difference between the reference image divided by the reference image dividing section, that is, the image containing both the display color of the one projector and the display color of the other projector in the monochromatic display period, and the image corresponding to the display color displayed by the one projector in the monochromatic display period to produce the reference difference image as an image containing only the display color of the other projector. Thus, the produced reference difference image is substantially equivalent to the image corresponding to the projection image projected on the projection surface from the other projector and obtained by the reference image pickup device in the monochromatic display period. Similarly, the detection difference image produced by the detection difference image producing section is substantially equivalent to the image corresponding to the projection image projected on the projection surface from the other projector and obtained by the detection image pickup device disposed close to the one projector in the monochromatic display period. Thus, the shadow area judging unit designating the one projector as the correction target can judge the shadow area generated on the projection image projected on the projection surface from the other projector based on the reference difference image and the detection difference image. Similarly, the shadow area judging unit designating the other projector as the correction target can judge the shadow area generated on the projection image projected on the projection surface from the one projector based on the reference difference image and the detection difference image. It is thus possible to directly obtain the projection image projected on the projection surface from the respective projectors, and judge the shadow area based on the obtained image. As a result, the structure of the image correcting apparatus can be simplified without necessity for using the invisible light emitting devices discussed above.

According to the first aspect of the invention, it is preferable that the shadow area judging unit includes: a reference image integrating section which sequentially acquires reference images obtained by the reference image pickup device and integrates pixel values in the acquired reference images for each corresponding pixel; and a detection image integrating section which sequentially acquires detection images obtained by the detection image pickup device disposed close to the correction target projector and integrates pixel values in the acquired detection images for each corresponding pixel. In this case, the reference image dividing section divides a reference image integrated in the monochromatic display period in synchronization with the display timing of each of the projectors for displaying respective colors from reference images integrated by the reference image integrating section. Also, the detection image dividing section divides a detection image integrated in the monochromatic display period in synchronization with the display timing of each of the projectors for displaying respective colors from detection images integrated by the detection image integrating section.

In case of projectors which display image of respective colors with time-sharing system by turning on or off an LED (light emitting diode) as a light source or varying (ON/OFF) inclination of micro-mirrors of DMD (digital micro-mirror device) as a light modulation element, the LED or DMD is generally turned on or off under PWM control. Thus, the period for displaying image and the period for displaying no image are mixed in the monochromatic period. In this case, there is a possibility that the reference image dividing section and the detection image dividing section acquire the reference image and detection image obtained during the period for displaying no image in the monochromatic period.

According to this structure, however, the reference image integrating section and the detection image integrating section of the shadow area judging unit integrate the respective images obtained during the period for displaying image and the period for displaying no image in the monochromatic display period. Thus, the reference image dividing section and detection image dividing section can securely obtain the reference image and detection image obtained during the period for displaying image in the monochromatic period.

A projection system according to a second aspect of the invention includes: a plurality of projectors each of which modulates light emitted from a light source according to image information to form an image, and projects the image to display a projection image on a projection surface, the respective projection images projected by the plural projectors being stacked to display a composed projection image on the projection surface; and the image correcting apparatus described above.

According to the second aspect of the invention, the projection system having the image correcting apparatus described above offers operations and advantages similar to those of the above image correcting apparatus.

An image correcting method according to a third aspect of the invention is used in a projection system which includes a plurality of projectors installed away from each other, each of which projectors modulates light emitted from a light source according to image information, and projects the modulated image on a projection surface to display a projection image. The respective projection images projected by the plural projectors are stacked to display a composed projection image on the projection surface. The projectors correct the image by the image correcting method using an image correcting apparatus. The image correcting apparatus includes: a reference image pickup device disposed at a chief audience position for observing the composed projection image to obtain an image of the projection surface on which the composed projection image is displayed and output a reference image; a plurality of detection image pickup devices each of which is disposed close to the corresponding one of the plural projectors to obtain an image of the projection surface in the same direction as the projection direction of the corresponding projector and output a detection image; and a correction control device which controls operations of the reference image pickup device and the plural detection image pickup devices. The correction control device performs a shadow area judging step for judging a shadow area generated on a projection image projected by the projector other than the correction target projector of the plural projectors and displayed on the projection surface based on a detection image obtained by the detection image pickup device disposed close to the correction target projector as a target of image correction and a reference image obtained by the reference image pickup devices and a shadow correction parameter producing step for giving weights to the shadow area and the non-shadow area other than the shadow area to produce shadow correction parameter containing luminance correction weight information based on which the correction target projector corrects luminance of areas corresponding to the shadow area and the non-shadow area in the image according to the weights.

According to the third aspect of the invention, the image correcting method using the image correcting apparatus described above offers operations and advantages similar to those of the above image correcting apparatus.

An image correcting program according to a fourth aspect of the invention is used in a projection system which includes a plurality of projectors installed away from each other, each of which projectors modulates light emitted from a light source according to image information, and projects the modulated image on a projection surface to display a projection image. The respective projection images projected by the plural projectors are stacked to display a composed projection image on the projection surface. The projectors correct the image using an image correcting apparatus operated under the image correcting program. The image correcting apparatus includes: a reference image pickup device disposed at a chief audience position for observing the composed projection image to obtain an image of the projection surface on which the composed projection image is displayed and output a reference image; a plurality of detection image pickup devices each of which is disposed close to the corresponding one of the plural projectors to obtain an image of the projection surface in the same direction as the projection direction of the corresponding projector and output a detection image; and a correction control device which controls operations of the reference image pickup device and the plural detection image pickup devices. The correction control device performs a shadow area judging step for judging a shadow area generated on a projection image projected by the projector other than the correction target projector of the plural projectors and displayed on the projection surface based on a detection image obtained by the detection image pickup device disposed close to the correction target projector as a target of image correction and a reference image obtained by the reference image pickup device, and a shadow correction parameter producing step for giving weights to the shadow area and the non-shadow area other than the shadow area to produce shadow correction parameter containing luminance correction weight information based on which the correction target projector corrects luminance of areas corresponding to the shadow area and the non-shadow area in the image according to the weights.

A storing medium according to a fifth aspect of the invention records the image correcting program described above such that the image correcting program is readable by a computer.

The image correcting program and the recording medium having these structures are used to execute the above image correcting method, and therefore offer operations and advantages similar to those of the above image correcting method. Since the image correcting program is recorded on the recording medium, the program can be easily handled.

BRIEF DESCRIPTION OF THE DRAWINGS

The invention will be described with reference to the accompanying drawings, wherein like numbers refer to like elements.

DESCRIPTION OF EXEMPLARY EMBODIMENTS

First Embodiment

A first embodiment according to the invention is hereinafter described with reference to the drawings.

Overall Structure of Projection System

Figure 1:
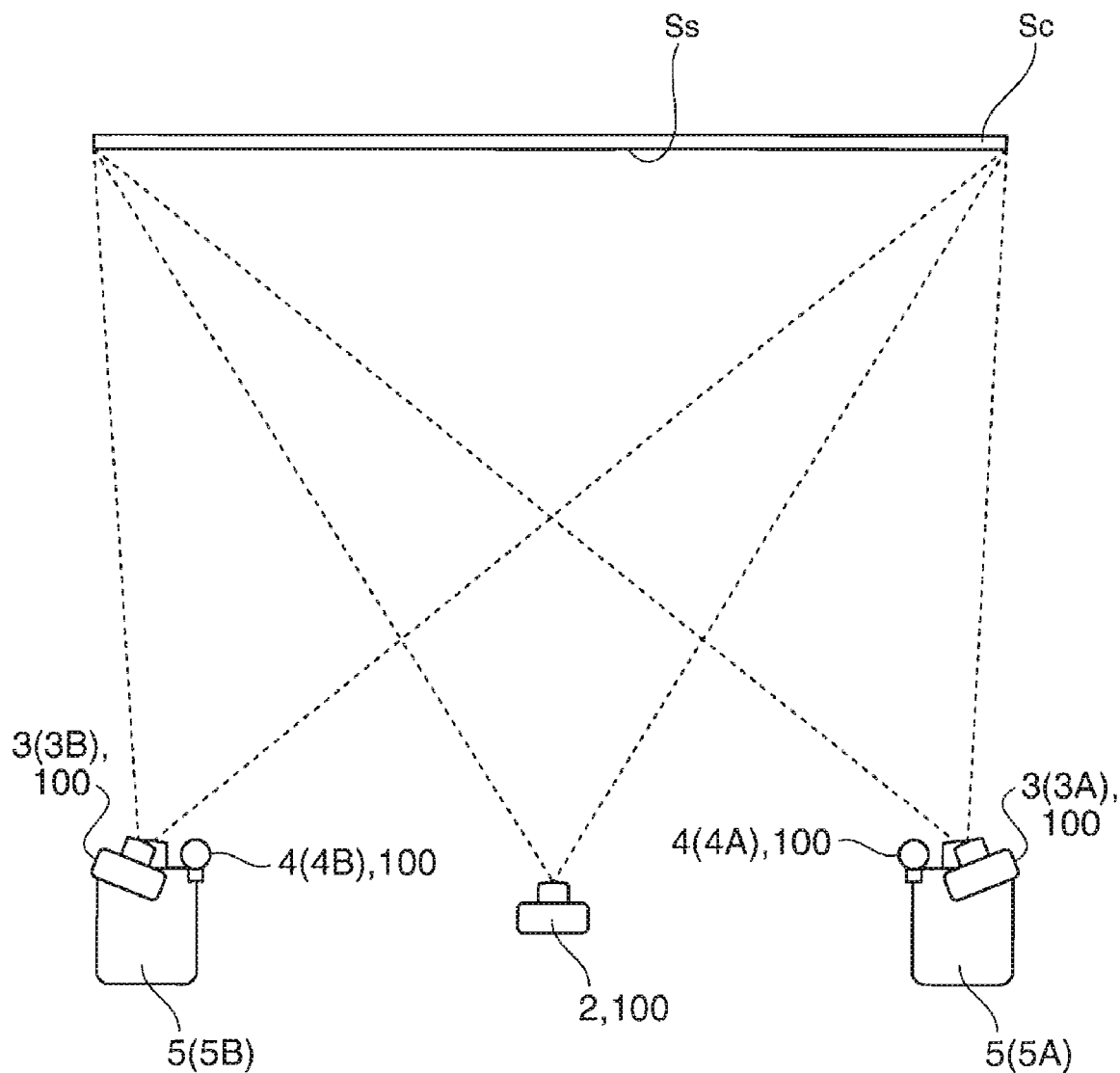
FIG. 1 illustrates a structure of a projection system in a first embodiment.

FIG. 1 illustrates a structure of a projection system 1.

The projection system 1 is a system which stacks respective projection images projected by a plurality of projectors on a screen Sc to display a large-screen image having high luminance and high resolution (composed projection image).

The screen Sc in this embodiment is a reflection type screen which reflects entering light to project an image, though not specifically shown in the figure. It is possible, however, to use a transmission type screen which transmits entering light to project an image.

As illustrated in FIG. 1, the projection system 1 includes a reference image pickup device 2, a plurality of detection image pickup devices 3 (the number of detection image pickup devices 3A and 3B is two which agrees with the number of projectors 5 in this embodiment), a plurality of invisible light emitting devices 4 (the number of invisible light emitting devices 4A and 4B is two which agrees with the number of the projectors 5 in this embodiment), and the plural projectors 5 (two projectors 5A and 5B installed horizontally in this embodiment).

As illustrated in FIG. 1, the reference image pickup device 2 is disposed at a main audience position for observing a composed projection image displayed on the screen Sc (a position opposed to approximately the center position of a projection surface Ss of the screen Sc in this embodiment). Under the control of the projectors 5, the reference image pickup device 2 obtains an image of the projection surface Ss of the screen Sc, and outputs an electric signal corresponding to the acquired image (reference image) to the projectors 5. In this embodiment, the reference image pickup device 2 is a CCD camera having a CCD (charge coupled device) as image pickup element and containing an area sensor. Though not specifically shown in the figure, an invisible light transmitting filter for blocking light in a visible region and transmitting light in an invisible region (infrared region in this embodiment) is provided on an image pickup surface of the reference image pickup device 2. While the invisible light emitting devices 4 are applying light to the projection surface Ss of the screen Sc, the reference image pickup device 2 detects the light (hereinafter referred to as infrared light) in the invisible region (infrared region) reflected by the projection surface Ss.

As illustrated in FIG. 1, the plural detection image pickup devices 3 are disposed close to the corresponding projectors 5. Under the control of the projectors 5, each of the detection image pickup devices 3 obtains an image of the projection surface Ss in the same direction as the image projection direction of the corresponding projector 5 (projector 5A for detection image pickup device 3A and projector 5B for detection image pickup device 3B), and outputs an electric signal corresponding to the obtained image (detection image) to the corresponding projector 5 (projector 5A for detection image pickup device 3A and projector 5B for detection image pickup device 3B). In this embodiment each of the detection image pickup device 3 has the same structure as that of the reference image pickup device 2. While the invisible light emitting devices 4 are applying light to the projection surface Ss of the screen Sc, each of the detection image pickup devices 3 detects the infrared light reflected by the projection surface Ss.

As illustrated in FIG. 1, the plural invisible light emitting devices 4 are disposed close to the corresponding projectors 5. Under the control of the projectors 5, each of the invisible light emitting devices 4 applies infrared light to the projection surface Ss of the screen Sc in the same direction as the image projection direction of the corresponding projector 5 (projector 5A for invisible light emitting device 4A and projector 5B for invisible light emitting device 4B). The invisible light emitting devices 4 may be any devices which can emit infrared light, such as a discharge emission type light source lamp and LED.

Figure 2:
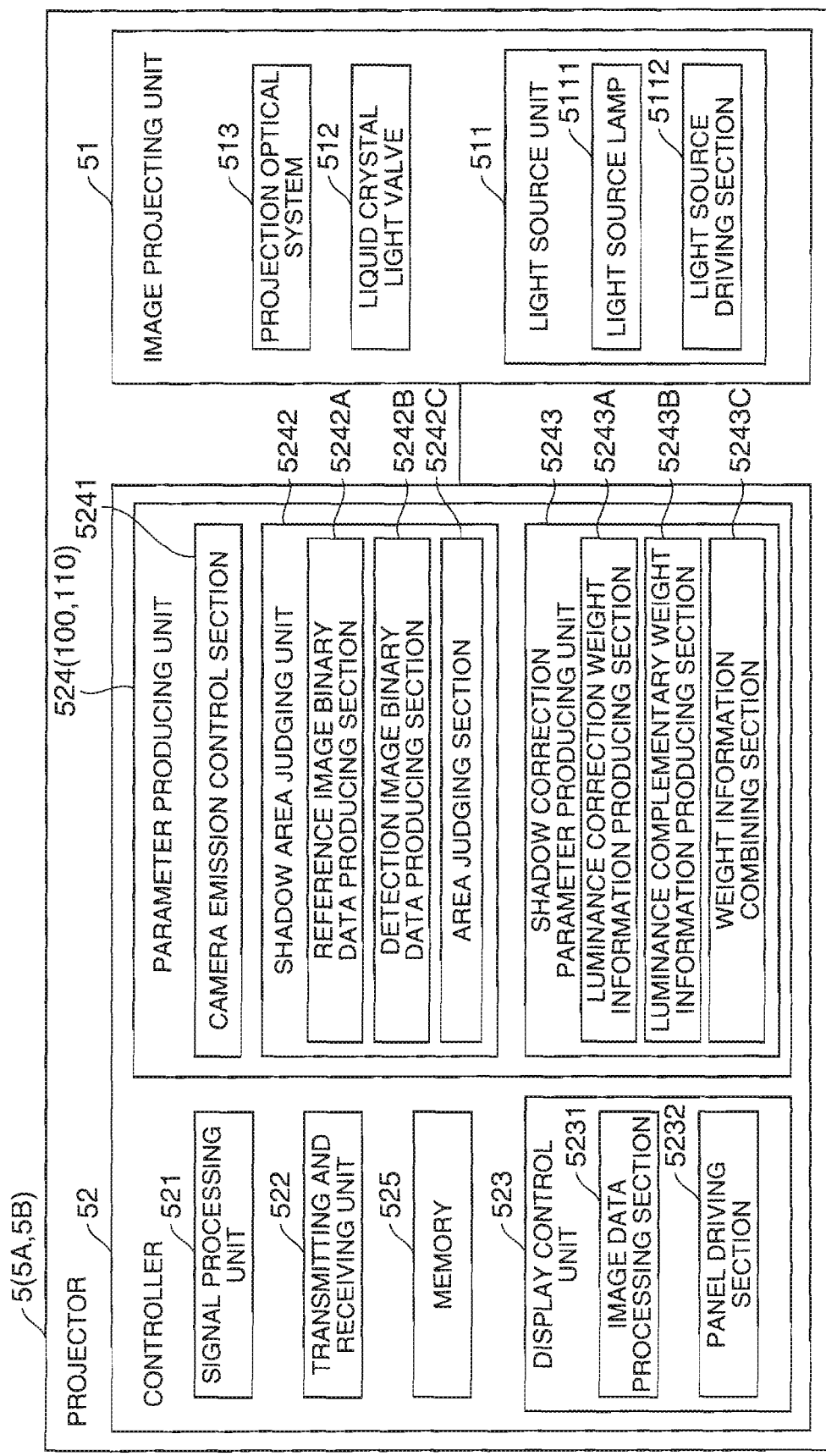
FIG. 2 is a block diagram showing a structure of a projector in the first embodiment.

FIG. 2 is a block diagram showing the structure of the projectors 5.

Though not specifically shown in the figure, the respective projectors 5 are connected with each other via a signal line so as to mutually transmit and receive information. Though not shown in the figure, the projector 5A is connected with the reference image pickup device 2, the detection image pick up device 3A, and the invisible light emitting device 4A via signal lines so as to control operations of the respective devices 2, 3A and 4A and receive electric signals outputted from the respective devices 2 and 3A. Similarly, though not specifically shown in the figure, the projector 5B is connected with the reference image pickup device 2, the detection image pickup device 3B, and the invisible light emitting device 4B via signal lines so as to control operations of the respective devices 2, 3B and 4B and receive electric signals outputted from the respective devices 2 and 3B.

In this embodiment, the projectors 5A and 5B have the same structure. Thus, the structure of only one of the projectors 5 is discussed herein.

The projector 5 applies predetermined image processing to an image signal (image information) outputted from an external device such as a DVD (digital versatile disc) player and a TV tuner, and optically processes light emitted from the light source based on the processed image signal to form an image (image light). Then, the projector 5 projects the image to display a projection image on the projection surface Ss of the screen Sc. In this embodiment, the projection system 1 produces a composed projection image by stacking the entire regions of the projection images obtained from the respective projectors 5A and 5B as illustrated in FIG. 1 (front projection type full-stack display).

As shown in FIG. 2, the projector 5 chiefly includes an image projecting unit 51 and a controller 52.

The image projecting unit 51 forms image light, and projects the image light on the screen Sc under the control of the controller 52. As shown in FIG. 2, the image projecting unit 51 includes a light source unit 511, liquid crystal light valves 512 as light modulating elements, a projection optical system 513, and other units.

The light source unit 511 emits light toward the liquid crystal light valves 512 under the control of the controller 52. As shown in FIG. 2, the light source unit 511 has a light source lamp 5111 and a light driving source unit 5112.

The light source lamp 5111 is constituted by an extra-high pressure mercury lamp. The light source lamp 5111 may be other discharge emission type light source lamps such as metal halide lamp and xenon lamp. Alternatively, the light source lamp 5111 may be formed by various solid light emission elements such as LED, laser diode, organic EL (electro luminescence) element, and silicon light emission element.

The light source driving unit 5112 drives the light source lamp 5111 by predetermined driving voltage under the control of the controller 52.

The liquid crystal light valves 512 are transmission type liquid crystal panels which transmit or block light emitted from the light source lamp 5111 by changing arrangement of liquid crystal molecules sealed in liquid crystal cells (not shown) based on a driving signal from the controller 52 to release image light corresponding to the driving signal to the projection optical system 513.

The projection optical system 513 projects the image light released from the liquid crystal light valves 512 on the screen Sc.

Though not shown in the figure, the liquid crystal light valves 512 of the projector 5 have three liquid crystal light valves in correspondence with three colors of R, G and B. The light source unit 511 has a color division optical system for dividing source light into three color lights. The projector 5 has a color synthesis optical system for synthesizing three color image lights into image light representing a color image. The projector 5 further has a lens shift mechanism for supporting the projection optical system 513 and freely shifting the projection optical system 513 in a direction orthogonal to the projection direction. These optical systems and lens shift mechanism may be similar to those included in various types of ordinary projector.

In this embodiment, the projectors 5A and 5B are disposed away from each other (so that their projection directions are different from each other) at a position opposed to the right region of the projection surface Ss of the screen Sc (right region as viewed from the audience) and at a position opposed to the left region of the projection surface Ss (left region as viewed from the audience), respectively, as illustrated in FIG. 1. By using the lens shift mechanism, the position of the projection image from the projector 5A is shifted to the left, and the position of the projection image from the projector 5B is shifted to the right so as to stack the entire regions of the respective projection images into a composed projection image.

The controller 52 includes a CPU (central processing unit) and other components. The controller 52 controls the entire projector 5, the reference image pickup device 2, the detection image pickup device 3 (detection image pickup device 3A for projector 5A, detection image pickup device 3B for projector 5B), and the invisible light emitting device 4 (invisible light emitting device 4A for projector 5A, invisible light emitting device 4B for projector 5B) under control program (including image correcting program) stored in a memory 525. In the structure of the controller 52, a function for processing inputted image signals is chiefly discussed, and other functions are not explained herein. As shown in FIG. 2, the controller 52 includes a signal processing unit 521, a transmitting and receiving unit 522, a display control unit 523, a parameter producing unit 524, the memory 525 and others. These units 521 through 525 are connected to one another by not shown buses so that necessary information is mutually exchangeable.

The memory 525 stores control programs (including image correcting program) and others.

The signal processing unit 521 converts an image signal inputted from an external device into a signal (digital signal) readable by the display control unit 523, and outputs the converted signal.

The transmitting and receiving unit 522 is connected with the other projector 5 via a not-shown signal line so that information can be transmitted and received to and from the other projector 5. The transmitting and receiving unit 522 is a signal converting circuit which executes transmission and reception of information under a standard corresponding to the signal line (for example, USB standard when the signal line is USB (universal serial bus) cable).

The display control unit 523 controls operation of the liquid crystal light valves 512. More specifically, the display control unit 523 applies predetermined image data processing to the image signal (digital image data) inputted via the signal processing unit 521 and outputs a driving signal corresponding to the digital image data to which the image data processing has been applied (hereinafter referred to as processed image data) to the liquid crystal light valves 512 so that the liquid crystal light valves 512 can form an image (image light) according to the processed image data. As shown in FIG. 2, the display control unit 523 has an image data processing section 5231, a panel driving section 5232, and other components.

The image data processing section 5231 applies various image data processes to the digital image data outputted from the signal processing unit 521. These image data processes include resolution converting process for matching the resolution of the digital image data with the resolution (pixel number) of the liquid crystal light valves 512, image size control process such as expansion and contraction, luminance control process, contrast control process, sharpness control process, process for synthesizing OSD (on-screen display) image such as menu and message, trapezoidal distortion correcting process, gamma correcting process, and other processes. Though not specifically shown the image data processing section 5231 has an image data storing section as a storing area used when the image data processing is performed. The image data storing section buffers the digital image data outputted from the signal processing unit 521. For example, the image data storing section may be a frame buffer which stores all digital image data for one screen, or a line buffer which stores scan data for one line in the horizontal direction.

The image data processing section 5231 executes shadow correcting process for correcting luminance value for each pixel in the digital image data based on shadow correction parameters produced by the parameter producing unit 524 when performing the luminance control process for the digital image data.

The panel driving section 5232 produces the driving signal for driving the liquid crystal light valves 512 from the processed image data to which the image data processing has been applied by the image data processing section 5231 and outputs the driving signal to the liquid crystal valves 512 so that the liquid crystal light valves 512 can form an image (image light) corresponding to the processed image data.

The parameter producing unit 524 switches between normal mode for normally operating the projector 5 and shadow correcting mode on appropriate occasions according to an operation signal outputted from a not-shown operation panel or remote controller equipped on the projector 5 and operated by the user. In the shadow correcting mode, the parameter producing unit 524 produces shadow correction parameters for correcting shadow generated on a projection image of the other projector 5 by the presence or an obstacle such as an audience on the optical path from the other projector 5 to the screen Sc under the condition where the obstacle blocks image light projected by the other projector 5. The parameter producing unit 524 also outputs a predetermined control command to the image data processing section 5231 and commands the image data processing section 5231 to execute shadow correcting process for the digital image data based on the produced shadow correction parameters. As illustrated in FIG. 2, the parameter producing unit 524 has a camera emission control section 5241, a shadow area judging unit 5242, a shadow correction parameter producing unit 5243, and others.

The camera emission control section 5241 controls operations of the reference image pickup device 2, the detection image pickup device 3 (detection image pickup device 3A for projector 5A and detection image pickup device 3B for projector 5B), and the invisible light emitting device 4 (invisible light emitting device 4A for projector 5A and invisible light emitting device 4B for projector 5B) in the shadow correcting mode.

The shadow area judging unit 5242 judges a shadow area generated on the projection image projected on the projection screen Ss by the other projector 5 different from the projector 5 (correction target projector) based on the reference image obtained by the reference image pickup device 2 and the detection image obtained by the detection image pickup device 3 (detection image pickup device 3A for projector 5A and detection image pickup device 3B for projector 5B). As shown in FIG. 2, the shadow area judging unit 5242 has a reference image binary data producing section 5242A, a detection image binary data producing section 5242B, and an area judging section 5242C.

The reference image binary data producing section 5742A receives an electric signal outputted from the reference image pickup device 2 and converts the electric signal into a digital signal to obtain a reference image (reference image data) containing information on a pixel value (luminance value) of predetermined luminance for each pixel. Then, the reference image binary data producing section 5242A produces reference image binary data which contains two values determined according to the level of the luminance value (large or small) for each pixel in the reference image data. For example, the reference image binary data producing section 5242A produces reference image binary data containing two values of "0" for a pixel having small luminance value and "1" for a pixel having large luminance value.

The detection image binary data producing section 5242B receives an electric signal outputted from the detection image pickup device 3 (detection image pickup device 3A for projector 5A and detection image pickup device 3B for projector 5B) and converts the electric signal into a digital signal to obtain a detection image (detection image data) containing information on a pixel value (luminance value) of predetermined luminance for each pixel. Then, the detection image binary data producing section 5242B produces detection image binary data which contains two values determined according to the level of the luminance value (large or small) for each pixel in the detection image data. For example, similarly to the reference image binary data producing unit 5242A, the detection image binary data producing section 5242B, produces detection image binary data containing two values of "0" for a pixel having small luminance value and "1" for a pixel having large luminance value.

The area judging section 5242C calculates the theoretical sum of the reference image binary data and the detection image binary data for each pair of corresponding pixels to produce judging image data for judging the shadow area. The area judging section 5242C judges the shadow area based on the judging image data. For example, the judging image data produced by the area judging section 5242C determines "1" when either one or both of a pair of corresponding pixels in the reference image binary data and the detection image binary data are "1", and determines "0" when both of a pair of corresponding pixels in the reference image binary data and the detection image binary data are "0" based on the theoretical sum of the reference image binary data and the detection image binary data for each pair of corresponding pixels. Then, the area judging section 5242C judges the area of "0" for each pixel as the shadow area based on the judging image data.

The shadow correction parameter producing unit 5243 gives weights to the shadow area determined by the area judging section 5242C and area other than the shadow area, and produces shadow correction parameters for correcting luminance of the shadow area and of the area other than the shadow area using the image data processing section 5231 according to the given weights (shadow correcting process) As shown in FIG. 2, the shadow correction parameter producing unit 5243 has a luminance correction weight information producing section 5243A, a luminance complementary weight information producing section 5243B, and a weight information combining section 5243C.

The luminance correction weight information producing unit 5243A establishes a predetermined correction area including the shadow area determined by the area judging section 5242C, and establishes an area other than the established correction area as non-shadow area. Then, the luminance correction weight information producing section 5243A gives weight "1" to each pixel in the shadow area, and weight "0" to each pixel in the non-shadow area. The weight given to each pixel in the area (hereinafter referred to as correction shadow area) other than the shadow area included in the correction area by the luminance correction weight information producing section 5243A gradually changes from the weight of each pixel in the shadow area to the weight of each pixel in the non-shadow area as the position of the weight shifts from the shadow area to the non-shadow area. The luminance correction weight information producing section 5243A produces luminance correction weight information containing information about weight for each pixel by this method.

The luminance complementary weight information producing section 5243B produces luminance complementary weight information as reversed information of the luminance correction weight information produced by the luminance correction weight information producing section 5243A on the basis of "0". Then, the luminance complementary weight Information producing section 5243B transmits the produced luminance complementary weight information to the other projector 5 via the transmitting and receiving unit 522.

The weight information combining section 5243C combines (calculates the sum of) the luminance correction weight information produced by the luminance correction weight information producing section 5243A and the luminance complementary weight information transmitted from the other projector 5 via the transmitting and receiving unit 522 for each pair of corresponding pixels. Then, the weight information combining unit 5243C converts the combined information into shadow correction parameters containing information about weight for each pixel by using predetermined formula.

In the structure described above, the reference image pickup device 2, the two detection image pickup devices 3, the two invisible light emitting devices 4, and the respective parameter producing units 524 included in the respective projectors 5 correspond to an image correcting apparatus 100 (FIGS. 1 and 2) according to an aspect of the invention. Also, the respective parameter producing units 524 included in the respective projectors 5 correspond to correction control devices 110 (FIG. 2) according to an aspect of the invention.

Operation of Projection System

Figure 3:
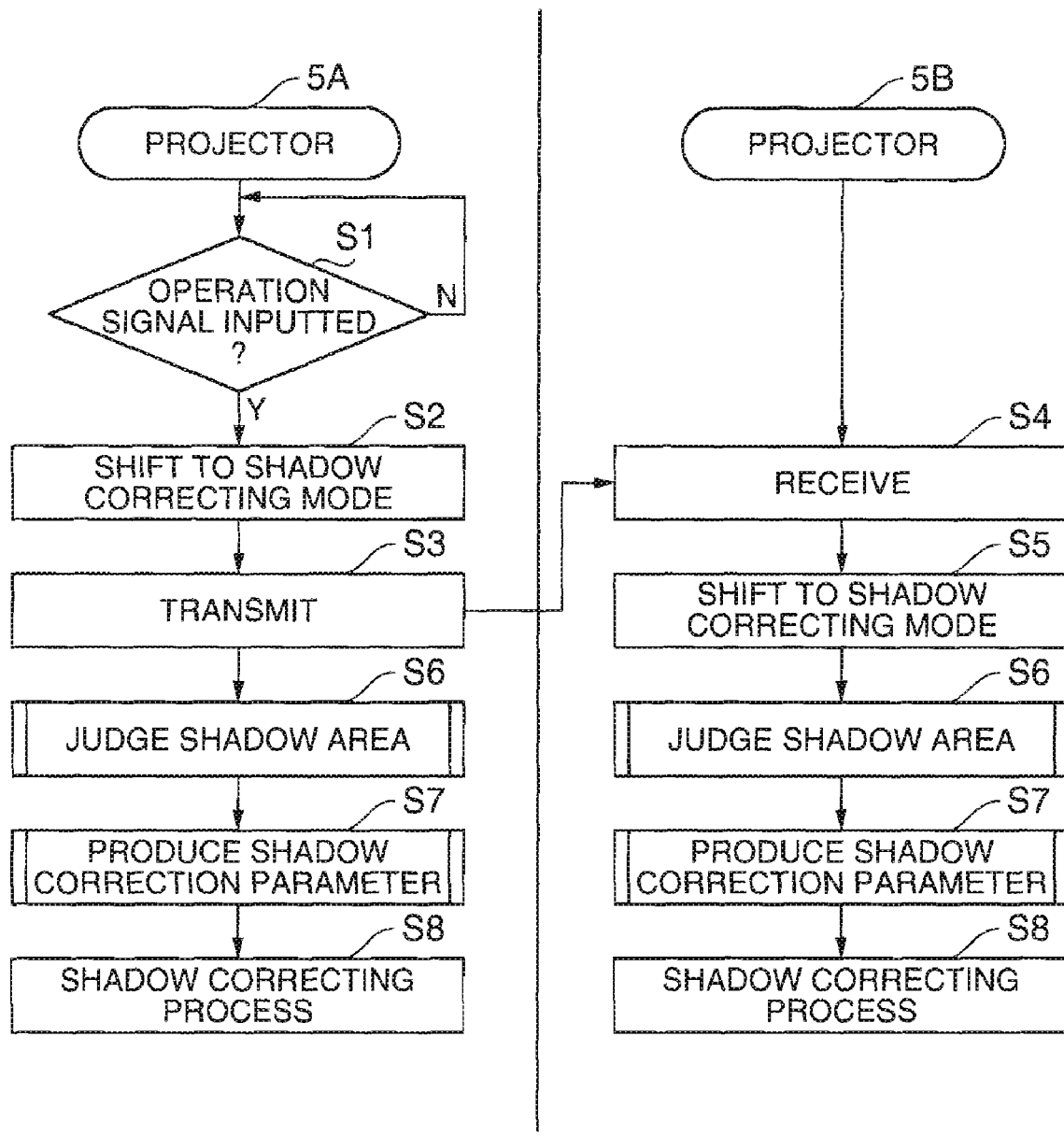
FIG. 3 is a flowchart showing operation (image correcting method) of the projection system in the first embodiment.

FIG. 3 is a flowchart showing operation (image correcting method) of the projection system 1.

Figure 4:
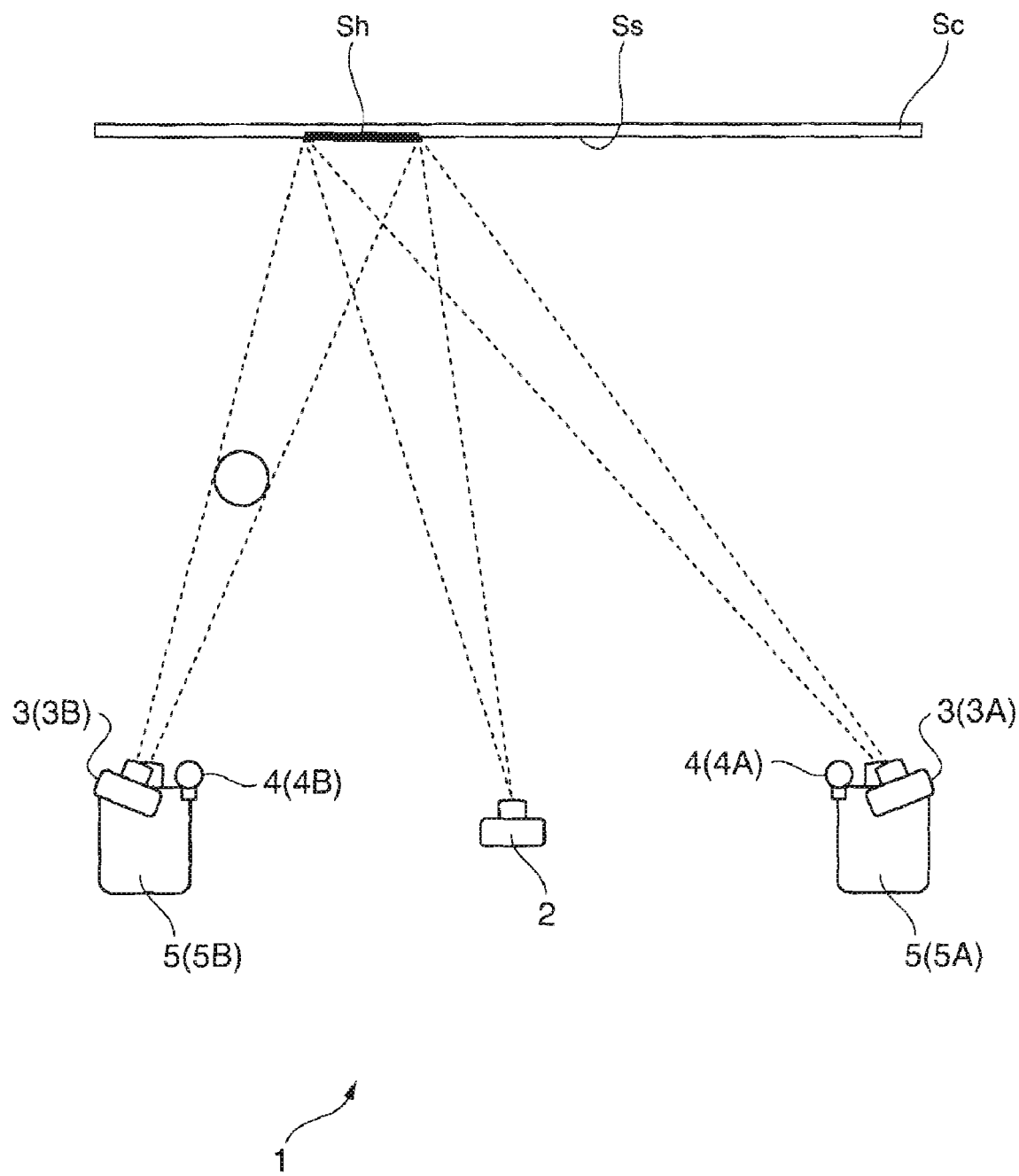
FIG. 4 illustrates an example of the operation (image correcting method) of the projection system in the first embodiment.

FIG. 4 illustrates an example of the operation (image correcting method) of the projection system 1.

The operation of the projection system 1 having the above structure is now described with reference to the drawings.

In the following description, an operation (image correcting method) for producing shadow correction parameters and executing shadow correcting process based on the shadow correction parameters is chiefly explained, and other operations are not described herein. As mentioned above, the reference image pickup device 2, the respective detection image pickup devices 3, the respective invisible light emitting devices 4, and the respective projectors 5 are connected with one another via signal lines. In the description, the following conditions are assumed. As illustrated in FIG. 1, the projectors 5 are installed in such positions that the entire regions of the respective projection images overlap with each other. The respective projectors 5 are set in the normal mode, and the respective projection images are displayed on the projection surface Ss so that a composed projection image is formed thereon as illustrated in FIG. 1. An obstacle O such as an audience located on the projection optical path between the projector 5B and the projection surface Ss blocks image light released from the projector 5B, and thus produces shadow Sh on the composed projection image as illustrated in FIG. 4. The obstacle O does not block image light released from the projector 5A as illustrated in FIG. 4. The obstacle O does not exist on the camera vision of the reference image pickup device 2 as illustrated in FIG. 4. In the following description, the shape of the obstacle O is spherical for simplifying the explanation.

Initially, when the user operates the not-shown operation panel to input an operation signal requiring "execution of shadow correcting process" to the controller 52 included in either of the projectors 5 (for example, projector 5A) through the operation panel (step S1), the parameter producing unit 524 of the controller 52 shifts from the normal mode to the shadow correcting mode in response to the inputted operation signal (step S2).

After step S2, the parameter producing unit 524 of the projector 5A transmits a predetermined mode shift signal requiring "shift to shadow correcting mode" to the projector 5B through the transmitting and receiving unit 522 (step S3).

After step S3, the parameter producing section 524 of the projector 5B receives the mode shift signal from the projector 5A via the transmitting and receiving unit 522 (step S4), and shifts from the normal mode to the shadow correcting mode (step S5).

Under the condition of the shadow correcting mode after transition from the normal mode in steps S2 and S5, image lights projected by the respective projectors 5 are displayed on the projection surface Ss as projection images to form a composed projection image similarly to the condition of the normal mode.

After steps S3 and S5, each of the projectors 5 executes process for judging the area of the shadow Sh (shadow area) generated on the composed projection image (step S6: shadow area judging step).

Figure 5:
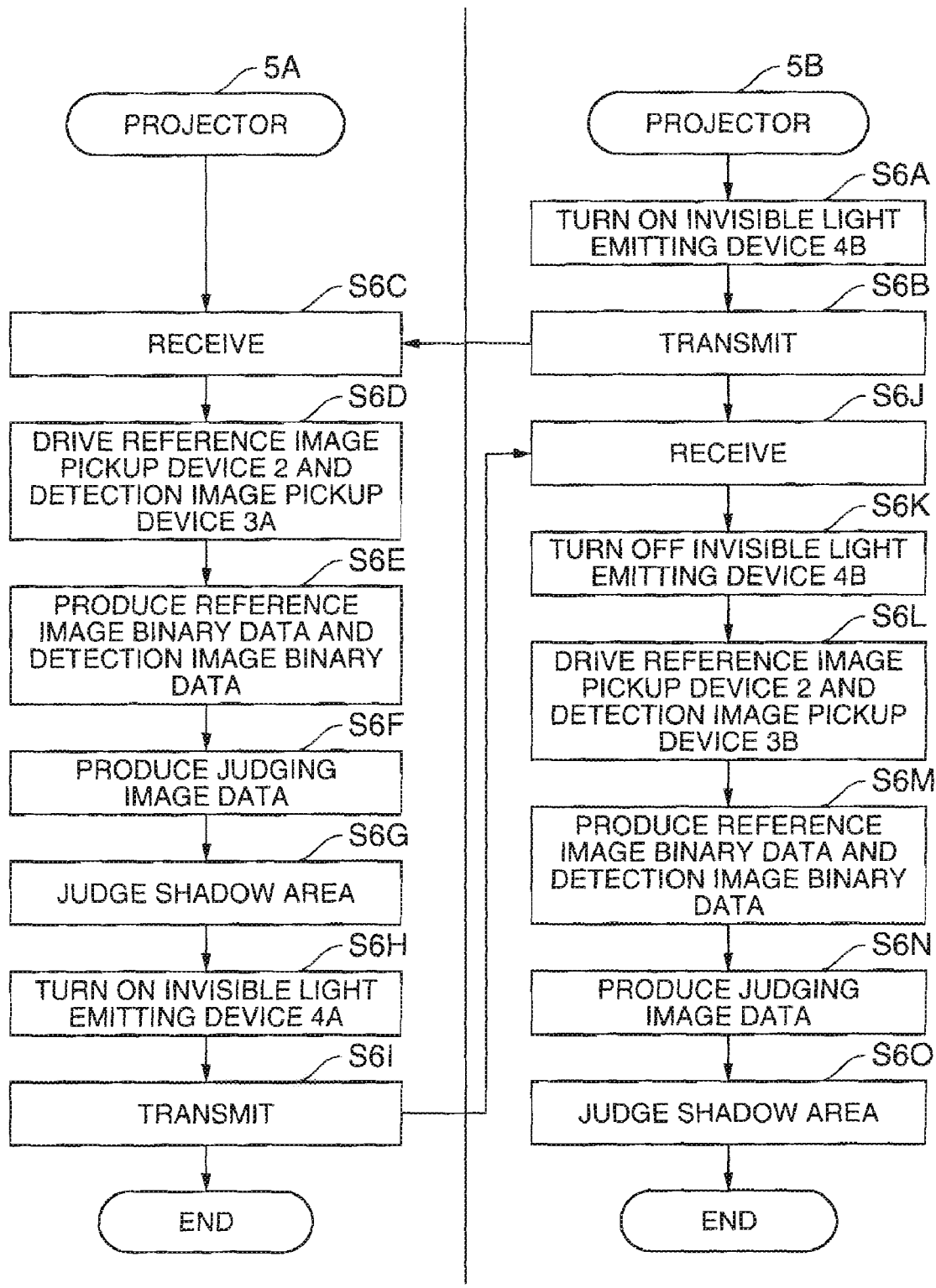
FIG. 5 is a flowchart showing shadow area judging process in the first embodiment.

FIG. 5 is a flowchart showing the shadow area judging process.

Figure 6:
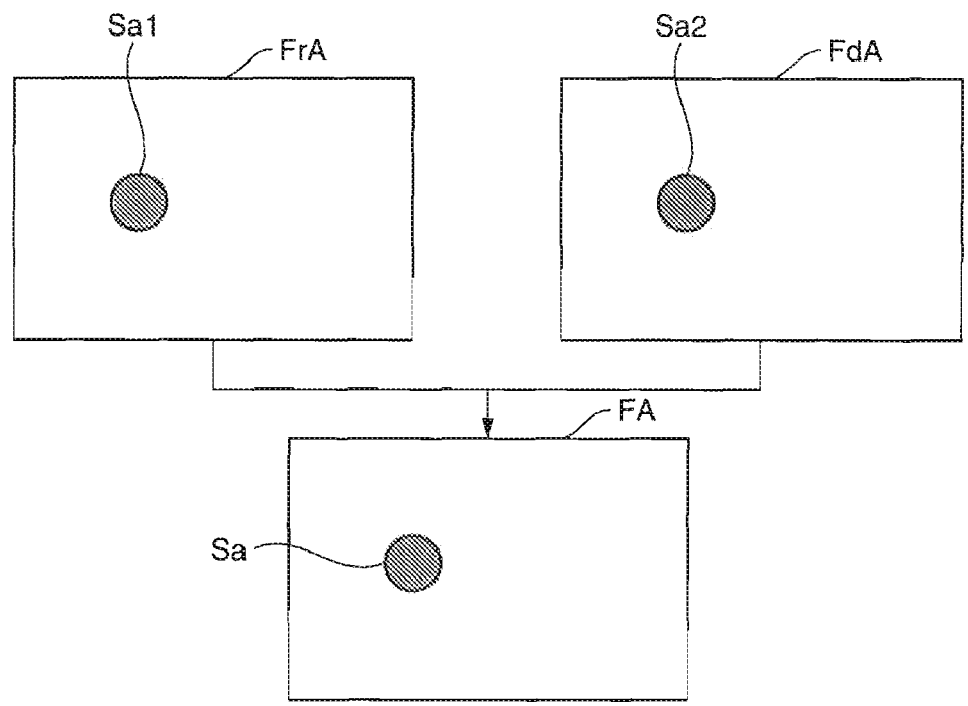
FIG. 6 is a view for explaining the shadow area judging process in the first embodiment.
Figure 7:
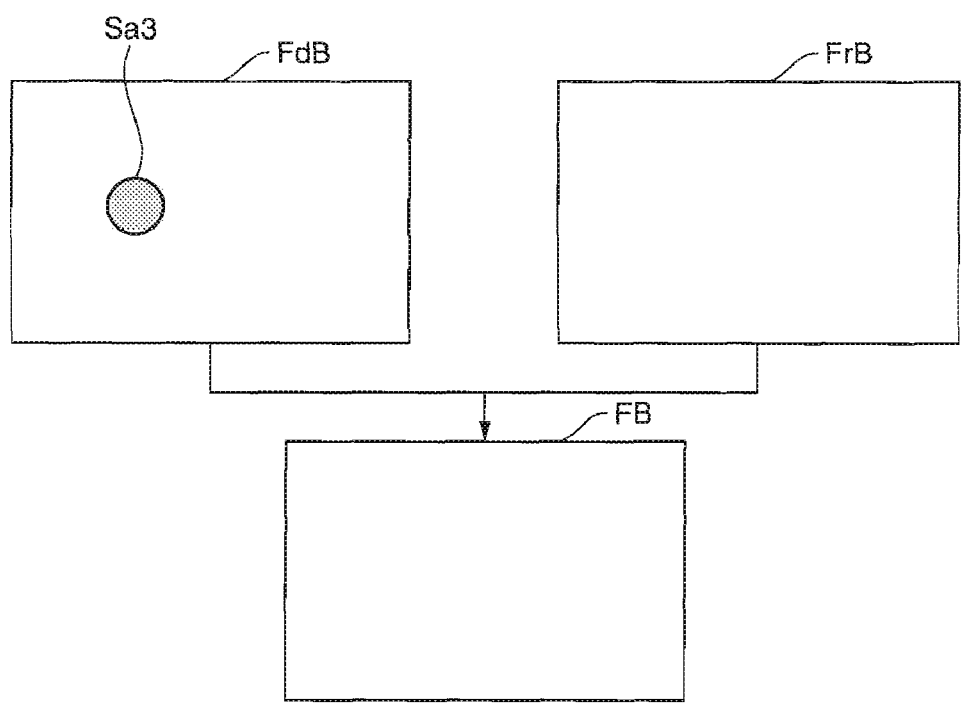
FIG. 7 is a view for explaining the shadow area judging process in the first embodiment.

FIGS. 6 and 7 are views for explaining the shadow area judging process.

Initially, the projector 5B operates in the following manner (steps S6A and S6B).

The camera emission control section 5241 operates the invisible light emitting device 4B so that infrared light can be emitted from the invisible light emitting device 4B (step S6A).

After step S6A, the camera emission control section 5241 transmits a turn-on start signal notifying "turn-on start of invisible light emitting device 4B" to the projector 5A via the transmitting and receiving unit 522 (step S6B).

After step S6B, the projector 5A operates in the following manner (steps S6C through S6I).

In step S6C, the camera emission control section 5241 receives the turn-on start signal from the projector 5B via the transmitting and receiving unit 522, and drives the reference image pickup device 2 and the detection image pickup device 3A so that each of the units 2 and 3A can obtain an image of the projection surface Ss (step S6D).

After step S6D, the reference image binary data producing section 5242A receives an electric signal from the reference image pickup device 2 and converts the electric signal to a digital signal to acquire reference image data containing information about pixel value (luminance value) of predetermined luminance for each pixel. In this case, the obstacle O blocks a part of the infrared light emitted from the invisible light emitting device 4B and reflected by the projection surface Ss toward the reference image pickup device 2 as illustrated in FIG. 4. Thus, a reference image FrA corresponding to the reference image data has an area Sa1 corresponding to the position of the shadow Sh (hereinafter referred to as expected shadow area) whose luminance value is smaller than that of the other area as illustrated in FIG. 6. Then, the reference image binary data producing section 5242A recognizes the luminance value for each pixel based on the reference image data, and produces reference image binary data containing two values of "0" for pixels having small luminance value (pixels within expected shadow area Sa1) and "1" for pixels having large luminance value (pixels in area other than expected shadow area Sa1) (step S6E).

Accordingly, the reference image pickup device 2 located at the chief audience position virtually obtains the projection image projected on the projection surface Ss from the projector 5B by detecting the infrared light emitted from the invisible light emitting device 4B under the turned-on condition and reflected by the projection surface Ss in steps S6A and S6D.

After step S6D, the detection image binary data producing section 5242B receives an electric signal outputted from the detection image pickup device 3A and converts the electric signal into a digital signal to acquire detection image data containing information about pixel value (luminance value) of predetermined luminance for each pixel. In this case, the obstacle O blocks a part of the infrared light emitted from the invisible light emitting device 4B and reflected by the projection surface Ss toward the detection image pickup device 3A as illustrated in FIG. 4. Thus, a detection image FdA corresponding to the detection image data has an area Sa2 corresponding to the position of the shadow Sh (hereinafter referred to as expected shadow area) whose luminance value is smaller than that of the other area as illustrated in FIG. 6 similarly to the reference image FrA. Then, the detection image binary data producing section 5242B recognizes the luminance value for each pixel based on the detection image data, and produces detection image binary data containing two values of "0" for pixels having small luminance value (pixels within expected shadow area Sa2) and "1" for pixels having large luminance value (pixels in area other than expected shadow area Sa2) (step S6E).

Accordingly, the detection image pickup device 3A located at the position of the projector 5A virtually obtains the projection image projected on the projection surface Ss from the projector 5B by detecting the infrared light emitted from the invisible light emitting device 4B under the turned-on condition and reflected by the projection surface Ss in steps S6A and S6D.

After step S6E, the area judging section 5242C calculates the theoretical sum of the reference image binary data and the detection image binary data for each pair of corresponding pixels and produces judging image data for judging the shadow area (step S6F). In this case, the expected shadow area Sa1 of the reference image FrA and the expected shadow area Sa2 of the detection image FdA are located at the same positions of the areas Sa1 and Sa2, respectively. Thus, in a judging image FA based on the judging image data, each pixel in an area Sa corresponding to the expected shadow areas Sa1 and Sa2 is "0" and each pixel in the other area is "1" based on the theoretical sum of the reference image binary data and detection image binary data for each pair of corresponding pixels.

After step S6F, the area judging section 5242C judges the area Sa containing pixels of "0" as a shadow area based on the judging image data (step S6G).

After step S6G, the camera emission control section 5241 operates the invisible light emitting device 4A so that infrared light can be emitted from the invisible light emitting device 4A (step S6H).

After step S6H, the camera emission control section 5241 transmits a turn-on start signal notifying "turn-on start of invisible light emitting device 4A" to the projector 5B via the transmitting and receiving unit 522 (step S6I).

After step S6I, the projector 5B operates in the following manner (step S6J through S6O).

The camera emission control section 5241 receives the turn-on start signal from the projector 5A via the transmitting and receiving unit 522 (step S6J). Then, the camera emission control section 5241 stops operation of the invisible light emitting device 4B and turns it off (step S6K).

After step S6K, the camera emission control section 5241 operates the reference image pickup device 2 and the detection image pickup device 3B so that each of the device 2 and 3B can obtain an image of the projection surface Ss (step S6L).

After step S6L, the reference image binary data producing section 5242A receives an electric signal from the reference image pickup device 2 and converts the electric signal to a digital signal to acquire reference image data containing information about pixel value (luminance value) of predetermined luminance for each pixel. In this case, the obstacle O does not block a part of the infrared light emitted from the invisible light emitting device 4A and reflected by the projection surface Ss toward the reference image pickup device 2 as illustrated in FIG. 4. Thus, the entire area of a reference image FrB corresponding to the reference image data has relatively large luminance value as illustrated in FIG. 7. Then, the reference image binary data producing section 5242A recognizes the luminance value for each pixel based on the reference image data, and produces reference image binary data containing "1" for pixels in the entire area having large luminance value (step S6M).

Accordingly, the reference image pickup device 2 located at the chief audience position virtually obtains the projection image projected on the projection surface Ss from the projector 5A by detecting the infrared light emitted from the invisible light emitting device 4A under the turned-on condition and reflected by the projection surface Ss in steps S6H and S6L.

After step S6L, the detection image binary data producing section 5242B receives an electric signal outputted from the detection image pickup device 3B and converts the electric signal into a digital signal to acquire detection image data containing information about pixel value (luminance value) of predetermined luminance for each pixel. In this case, the obstacle O blocks a part of the infrared light emitted from the invisible light emitting device 4A and reflected by the projection surface Ss toward the detection image pickup device 3B as illustrated in FIG. 4. Thus, a detection image FdB corresponding to the detection image data has an area Sa3 corresponding to the position of the obstacle O (hereinafter referred to as expected shadow area) whose luminance value is smaller than that of the other area as illustrated in FIG. 7. Then, the detection image binary data producing section 5242B recognizes the luminance value for each pixel based on the detection image data, and produces detection image binary data containing two values of "0" for pixels having small luminance value (pixels within expected shadow area Sa3) and "1" for pixels having large luminance value (pixels in area other than expected shadow area Sa3) (step S6M).

Accordingly, the detection image pickup device 3B located at the position of the projector 5B virtually obtains the projection image projected on the projection surface Ss from the projector 5A by detecting the infrared light emitted from the invisible light emitting device 4A under the turned-on condition and reflected by the projection surface Ss in steps S6H and S6L.

After step S6M, the area judging section 5242C calculates the theoretical sum of the reference image binary data and the detection image binary data for each pair of corresponding pixels and produces judging image data used for judging the shadow area (step S6N). In this case, the expected shadow area Sa3 exists on the detection image FdB but does not exist on the reference image FrB at the position corresponding to the expected shadow area Sa3 as illustrated in FIG. 7. Thus, in a judging image FB based on the judging image data, pixels in the entire area are "1" based on the theoretical sum of the reference image binary data and detection image binary data for each pair of corresponding pixels similarly to the case of the reference image FrB.

After step S6F, the area judging section 5242C judges that no area having pixels of "0" exists based on the judging image data, that is, no shadow area exists (step S6O).

After step S6, each of the projectors 5 executes process for producing shadow correction parameters (step S7: shadow correction parameter producing step).

Figure 8:
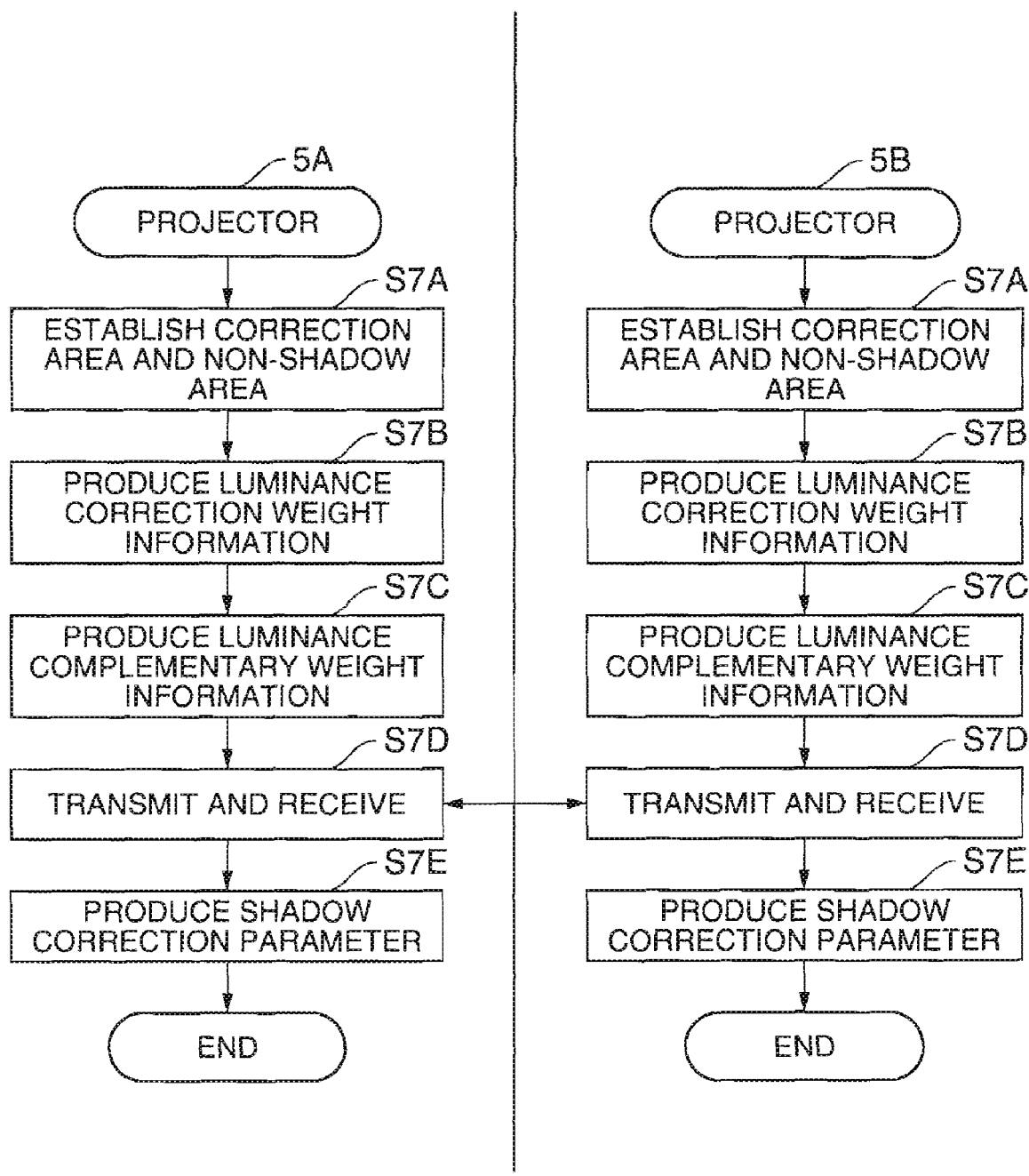
FIG. 8 is a flowchart showing shadow correction parameter producing process in the first embodiment.

FIG. 8 is a flowchart showing the process for producing shadow correction parameters.

Figure 9:
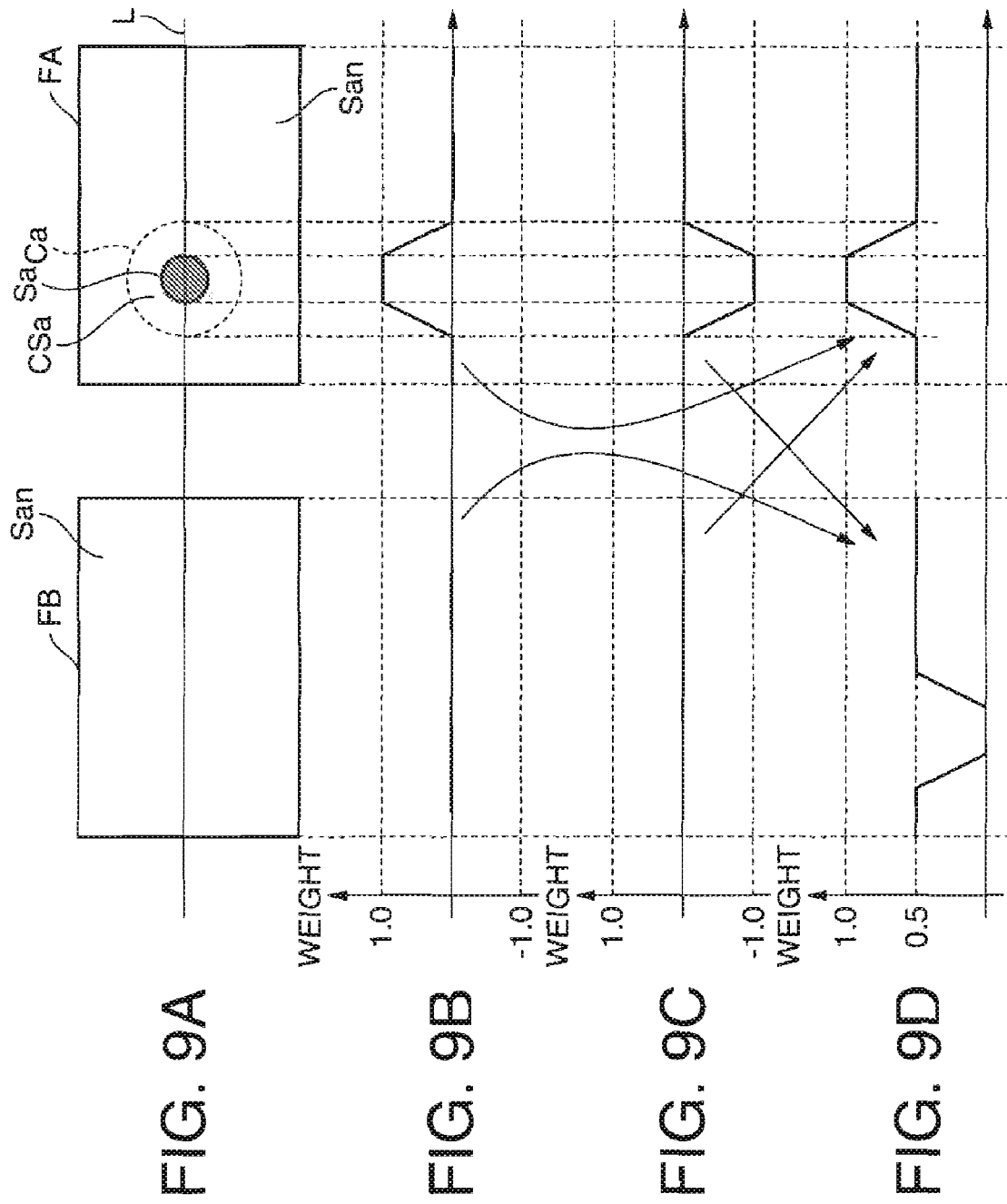
FIG. 9 is a view for explaining the shadow correction parameter producing process in the first embodiment.
Figure 10:
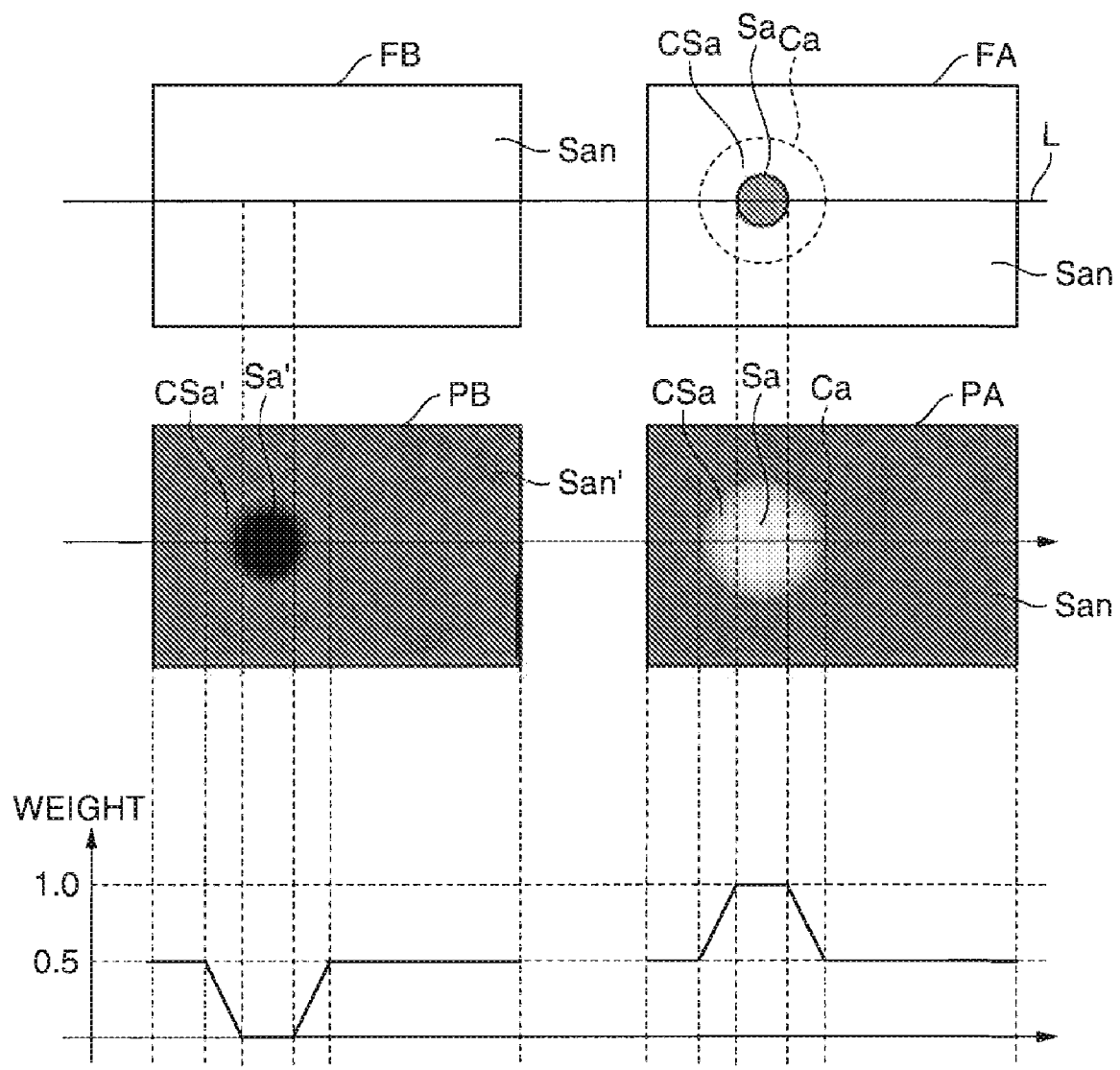
FIG. 10 is a view for explaining the shadow correction parameter producing process in the first embodiment.

FIGS. 9 and 10 are views for explaining the process for producing shadow correction parameters. More specifically, in graphs (B) through (D) of FIG. 9, the horizontal axis indicates respective positions of judging image FA and FB on a horizontal line L, and the vertical axis indicates weights. FIG. 10 shows shadow correction parameters PA and PB two-dimensionally, expressing weights by gray scale (weight "1" as white and weight "0" as black).

Initially, the luminance correction weight information producing section 5243A establishes the correction area and the non-shadow area for the judging images FA and FB based on the shadow area determined in step S6 (step S7A).

More specifically, as shown in graph (A) of FIG. 9, the luminance correction weight information producing section 5243A of the projector 5A sets a substantially circular area containing the shadow area Sa determined in step S6G as a correction area Ca, and sets the area other than the correction area Ca as a non-shadow area San for the judging image FA.

As shown in graph (A) of FIG. 9, the luminance correction weight information producing section 5243A of the projector 5B does not set a correction area but sets the entire area as the non-shadow area San for the judging image FB based on the judgment that no shadow area exists in step S6O.

After step S7A, the luminance correction weight information producing section 5243A produces luminance correction weight information containing information about weight for each pixel for the judging images FA and FB (step S7B).

More specifically, the luminance correction weight information producing section 5243A of the projector 5A produces the luminance correction weight information in the following manner.

As shown in graph (B) of FIG. 9, the luminance correction weight information producing section 5243A determines the weight of each pixel of the shadow area Sa as "1" and the weight of each pixel of the non-shadow area San as "0" for judging image FA. Also, as shown in graph (B) of FIG. 9, the luminance correction weight information producing section 5243A determines the weight of each pixel in an area CSa (hereinafter referred to as correction shadow area) other than the shadow area Sa in the correction area Ca as weight gradually changing from the weight "1" of each pixel in the shadow area Sa to the weight "0" of each pixel in the non-shadow area San as the position of the weight shifts from the shadow area Sa to the non-shadow area San for the judging image FA.

The luminance correction weight information producing section 5243A of the projector 5B produces the luminance correction weight information in the following manner.

As shown in graph (B) of FIG. 9, the luminance correction weight information producing section 5243A determines the weight of each pixel in the entire area as "0" for judging image FB based on the condition where the entire area is the non-shadow area San.

After step S7B, the luminance complementary weight information producing section 5243B produces luminance complementary weight information by reversing the weight for each pixel produced in step S7B according to the luminance correction weight information on the basis of "0" (step S7C).

More specifically, the luminance complementary weight information producing section 5243B of the projector 5A produces the luminance complementary weight information in the following manner.

As shown in graph (C) of FIG. 9, the luminance complementary weight information producing section 5243B determines the weight of each pixel in the shadow area Sa as "-1" and the weight of each pixel in the non-shadow area San as "0" for judging image FA by reversing the weight of each pixel according to the luminance correction weight information on the basis of "0". Also, as shown in graph (C) of FIG. 9, the luminance complementary weight information producing section 5243B determines the weight of each pixel in the correction shadow area CSa as weight gradually changing from the weight "-1" of each pixel in the shadow area Sa to the weight "0" of each pixel in the non-shadow area San as the position of the weight shifts from the shadow area Sa to the non-shadow area San for the judging image FA.

The luminance complementary weight information producing section 5243B of the projector 5B produces the luminance complementary weight information in the following manner.

As shown in graph (C) of FIG. 9, the luminance complementary weight information producing section 5243B produces luminance complementary weight information equivalent to the luminance correction weight information by reversing the weight of each pixel according to the luminance correction weight information on the basis of "0" since the weight of all the pixels according to the luminance correction weight information is "0".

After step S7C, each of the projectors 5 executes transmission and reception of the produced luminance complementary weight information via the corresponding transmitting and receiving unit 522 (step S7D). More specifically, the projector 5A transmits the self-produced luminance complementary weight information to the projector 5B via the transmitting and receiving unit 522, and the projector 5B receives this luminance complementary weight information. Also, the projector 5B transmits the self-produced luminance complementary weight information to the projector 5A via the transmitting and receiving unit 522, and the projector 5A receives this luminance complementary weight information.

After step S7D, the weight information combining section 5243C produces the shadow correction parameters PA and PB containing information about weight for each pixel by combining the luminance correction weight information produced in step S7B and the luminance complementary weight information transmitted from the other projector 5 in step S7D for each pair of corresponding pixels, and then converting the combined information according to the following equation (1):

$$PA, PB = 0.5 \times (\text{luminance correction weight information} + \text{luminance complementary weight information}) + 0.5 \quad (1)$$

More specifically, the weight information combining section 5243C of the projector 5A produces the shadow correction parameter PA in the following manner.

As shown in graph (D) of FIG. 9 and FIG. 10, the weight information combining section 5243C determines the weight of each pixel in the shadow area Sa as "1" and the weight for each pixel in the non-shadow area San as "0.5" for the judging image FA by using the above equation (1). Also, as shown in graph (D) of FIG. 9 and FIG. 10, the weight information combining section 5243C determines the weight of each pixel in the correction shadow area CSa as weight gradually changing from the weight "1" of each pixel in the shadow area Sa to the weight "0.5" of each pixel in the non-shadow area San as the position of the weight shifts from the shadow area Sa to the non-shadow area San for the judging image FA.

The weight information combining section 5243C of the projector 5B produces the shadow correction parameter PB in the following manner.

As shown in graph (D) of FIG. 9 and FIG. 10, the weight information combining section 5243C determines the weight of each pixel in an area Sa' corresponding to the shadow area Sa as "0" for the judging image FA and the weight for each pixel in an area San' corresponding to the non-shadow area San as "0.5" for the judging image FA by using the above equation (1). Also, as shown in graph (D) of FIG. 9 and FIG. 10, the weight information combining section 5243C determines the weight of each pixel in an area CSa' corresponding to the correction shadow area CSa in the judging image FA as weight gradually changing from the weight "0" of each pixel in the shadow area Sa' to the weight "0.5" of each pixel in the non-shadow area San' as the position of the weight shifts from the shadow area Sa' to the non-shadow area San' for the judging image FB.

After step S7, the respective projectors 5 execute shadow correcting process by using the respective shadow correction parameters PA and PB (step S8).

More specifically, the projector 5A executes the shadow correcting process in the following manner.

Initially, the image data processing section 5231 gives the weight of each pixel included in the shadow correction parameter PA to the luminance value for each corresponding pixel contained in the digital image data outputted from the signal processing unit 521 to execute the shadow correcting process for correcting the luminance value for each pixel in the digital image data. More specifically, the image data processing section 5231 corrects luminance value of each pixel corresponding to the shadow area Sa in the digital image data to luminance value having full luminance of the composed projection image since the weight of each pixel in the shadow area Sa in the shadow correction parameter PA is "1". The image data processing section 5231 also corrects the luminance value of each pixel corresponding to the non-shadow area San in the digital image data to luminance value having half of the full luminance of the composed projection image since the weight of each pixel in the non-shadow area San in the shadow correction parameter PA is "0.5". The image data processing section 5231 further corrects the luminance value of each pixel corresponding to the correction shadow area CSa in the digital image data to luminance value having luminance which changes from the full luminance of the composed projection image to half of the full luminance since the weight of each pixel in the correction shadow area CSa in the shadow correction parameter PA gradually changes from the weight "1" of each pixel in the shadow area Sa to the weight "0.5" of each pixel in the non-shadow area San as the position of weight shifts from the shadow area Sa to the non-shadow area San.

The projector 5B executes the shadow correction process in the following manner.

Initially, the image data processing section 5231 gives the weight of each pixel included in the shadow correction parameter PB to the luminance value for each pair of corresponding pixels contained in the digital image data outputted from the signal processing unit 521 to execute the shadow correcting process for correcting the luminance value for each pixel of the digital image data. More specifically, the image data processing section 5231 corrects the luminance value of each pixel corresponding to the area Sa' in the digital image data to zero since the weight of each pixel in the area Sa' in the shadow correction parameter PB is "0". The image data processing section 5231 also corrects the luminance value of each pixel corresponding to the area San' in the digital image data to luminance value having half of the full luminance of the composed projection image since the weight of each pixel of the area San' in the shadow correction parameter PB is "0.5". The image data processing section 5231 further corrects the luminance value of each pixel corresponding to the area CSa' in the digital image data to luminance value having luminance which changes from zero to half of the full luminance of the composed projection image since the weight of each pixel of the area CSa' in the shadow correction parameter PB gradually changes from the weight "0" of each pixel in the area Sa' to the weight "0.5" of each pixel in the area San' as the position of weight shifts from the area Sa' to the area San'.

According to the shadow correction process performed by the projectors 5, each of the projectors 5 displays the area containing no shadow Sh (area corresponding to non-shadow area San and area San') of the composed projection image formed on the projection surface Ss by half of the full luminance of the composed projection image so as to display the entire image by luminance value having the full luminance of the composed protection image. The projector 5A displays the area containing the shadow Sh (area corresponding to shadow area Sa) by the luminance value having the full luminance of the composed projection image, and the projector 5B does not display the area containing the shadow Sh (area corresponding to shadow area Sa') by setting the luminance value at zero. Thus, a part of image light released from the projector 5B is not reflected by the obstacle O.

The projection system 1 according to then first embodiment provides the following advantages.

In this embodiment, the projection system 1 includes the reference image pickup device 2, the two detection image pickup devices 3, the two invisible light emitting devices 4, and the two projectors 5. The projector 5A of the two projectors 5 has the display control unit 523, and the parameter producing unit 524 having the shadow area judging unit 5242 and the shadow correction parameter producing unit 5243. By this structure, the shadow area judging unit 5242 and the shadow correction parameter producing unit 5243 execute the shadow area judging step S6 and the shadow correction parameter producing step S7, respectively, to produce the shadow correction parameters, and the display control unit 523 performs the shadow correction process in step S8. Thus, the shadow Sh formed on the projection image projected by the projector 5B and displayed on the projection surface Ss becomes inconspicuous by the presence of the projection image projected by the projector 5A, contributing to reduction of degradation of the composed projection image caused by the shadow Sh.

Since the obstacle O is located on the projection optical path between the projector 5B and the projection surface Ss, the obstacle O is also present on the camera vision of the detection image pickup device 3B disposed close to the projector 5B. Thus, the detection image FdB obtained by the detection image pickup device 3B contains the expected shadow area Sa3 as the shadow area produced only by the presence of the obstacle O located on the camera vision and blocking the projection surface Ss. When the shadow area judging unit 5242 of the projector 5B performs the shadow area judging step S6 based only on the detection image FdB obtained by the detection image pickup device 3B, for example, the shadow area judging unit 5242 judges the expected shadow area Sa3 as the shadow area. In this case, the shadow correction parameter producing unit 5243 produces shadow correction parameters for correcting luminance of the expected shadow area Sa3. As a result, the display control unit 523 executes unnecessary shadow correcting process for raising luminance of the area corresponding to the expected shadow area Sa3 higher than luminance of the other area, for example, based on the shadow area correction parameter.

In this embodiment, the shadow area judging unit 5242 of the projector 5B judges the shadow area based on both the reference image FrB obtained by the reference image pickup device 2 disposed at the chief audience position and the detection image FdB obtained by the detection image pickup device 3B disposed close to the projector 5B. Since the expected shadow area Sa3 exists on the detection image FdB but does not exist on the reference image FrB obtained by the reference image pickup device 2 disposed at a position different from the position of the detection image pickup device 3B, the shadow area judging unit 5242 does not judge the expected shadow area Sa3 as shadow area based on the judgment from both the detection image FdB and the reference image FrB. Thus, the shadow correction parameter producing unit 5243 can produce highly accurate shadow correction parameters while preventing execution of unnecessary shadow correcting process by the display control unit 523.

The expected shadow areas Sa1 and Sa2 as true shadow areas, which are formed on the projection surface Ss under the condition where the obstacle O blocks a part of the image from the projector 5B, exist at the same positions on the reference image FrA obtained by the reference image pickup device 2 and on the detection image FdA obtained by the detection image pickup device 3A disposed close to the projector 5A, respectively. Since the shadow area judging unit 5242 of the projector 5A has the reference image binary data producing section 5242A, the detection image binary data producing section 5242B, and the area judging section 5242C, the shadow area judging unit 5242 calculates the theoretical sum of the reference image binary data as binary data of the reference image FrA and the detection image binary data as binary data of the detection image FdA for each pair of corresponding pixels to leave the expected shadow areas Sa1 and Sa2 in the judging image FA corresponding to the judging image data and thus appropriately judge the shadow area Sa.

The expected shadow area Sa3 as false shadow area exists on the detection image FdB obtained by the detection image pickup device 3B disposed close to the projector 5B but does not exist on the reference image FrB obtained by the reference image pickup device 2 disposed at a position different from the position of the detection image pickup device 3B. Since the shadow area judging unit 5242 of the projector 5B has the reference image binary data producing section 5242A, the detection image binary data producing section 5242B, and the area judging section 5242C, the shadow area judging unit 5242 calculates the theoretical sum of the reference image binary data as binary data of the reference image FrB and the detection image binary data as binary data of the detection image FdB for each pair of corresponding pixels to delete the expected shadow area Sa3 from the judging image FB corresponding to the judging image data and thus appropriately determine that no shadow area exists.

Accordingly, the shadow area judging unit 5242 easily and promptly distinguishes between the true shadow area and the false shadow area and judges only the true shadow area as shadow area.

When the shadow correction parameter producing unit produces shadow correction parameters for setting weights only for the shadow area and for the area other than the shadow area so that the display control unit 523 of the projector 5A can perform the shadow correction process based on these shadow correction parameters, for example, the boundary between these areas becomes conspicuous due to different luminance of the area corresponding to the shadow area from luminance of the area corresponding to the area other than the shadow area. In this case, appropriate prevention of degradation of the composed protection image is difficult.

According to this embodiment, however, the shadow correction parameter producing unit 5243 of the projector 5A sets weight for each of the shadow area Sa, correction shadow area Csa, and non-shadow area San, and produces shadow correction parameter containing weight which gradually changes from the weight of the shadow area Sa to the weight of the non-shadow area San as the position of the weight shifts from the shadow area Sa to the non-shadow area San. Since the display control unit 523 executes the shadow correction process based on the shadow correction parameters, luminance on the boundary between the area corresponding to the shadow area Sa and the area corresponding to the non-shadow area San gradually changes. As a result, the boundary becomes inconspicuous, thereby appropriately avoiding degradation of the composed projection image.

The shadow area Sa judged by the shadow area judging unit 5242 of the projector 5A corresponds to the area of the image released from the projector 5B and blocked by the obstacle O.

In this embodiment, the shadow correction parameter producing unit 5243 has the luminance correction weight information producing section 5243A, the luminance complementary weight information producing section 5243B, and the weight information combining section 5243C. The shadow correction parameter producing unit 5243 of the projector 5B combines the luminance correction weight information produced by the luminance correction weight information producing section 5243A, and the luminance complementary weight information produced by the luminance complementary weight information producing section 5243B which contains weight for decreasing the luminance of the area corresponding to the shadow area Sa lower than the luminance of the area corresponding to the non-shadow area San to produce the shadow correction parameter. Since the display control unit 523 of the projector 5B executes the shadow correction process based on this shadow correction parameter, the luminance of the area Sa' corresponding to the shadow area, that is, the luminance of the area of the image released from the projector 5B and applied to the obstacle O becomes lower (luminance 0 in this embodiment) than the luminance of the other area. As a result, a part of the image from the projector 5B is not reflected by the obstacle O, and the object O is not dazzled by the light of the projector 5B when the object O is an audience.

The projection system 1 has the two invisible light emitting devices 4. The reference image pickup device 2 and the two detection image pickup devices 3 detect light emitted from the invisible light emitting devices 4 and reflected by the projection surface Ss. This structure eliminates the necessity for controlling the projectors D such that the projectors 5 can display predetermined projection image (for example, projection image all pixels of which have the same gradation value (luminance value)) for the shadow area judging process performed by the shadow area judging unit 5242 (shadow area judging step S6). Thus, simplification of the control structure of the respective projectors 5 improves. Also, the projection system 1 can execute the shadow area judging step S6 and the shadow correction parameter producing step S7 with projection images (projection images to be seen by the audience) displayed by the respective projectors 5 by using the respective invisible light emitting devices 4.

In this embodiment, the respective parameter producing units 524 as the correction control devices 110 are included in the corresponding projectors 5. For example, it is assumed that the image correcting apparatus 100 is a component separated from the corresponding projectors, that is, the correction control devices 110 included in the image correcting apparatus 100 are personal computers or the like. In this case, the correction control devices 110 are connected with the corresponding projectors such that information is mutually transmittable and receivable, and the respective projectors perform the shade correction process based on the respective shadow correction parameters transmitted from the correction control devices 110 to the projectors. Compared with this structure, the projection system 1 in this embodiment has a structure simplified and easily provided.

Second Embodiment

A second embodiment according to the invention is now described with reference to the drawing.

In the following description, the same reference numbers are given to the similar structures and equivalent components to those in the first embodiment, and detailed explanation of those is not repeated or just briefly given.

Figure 11:
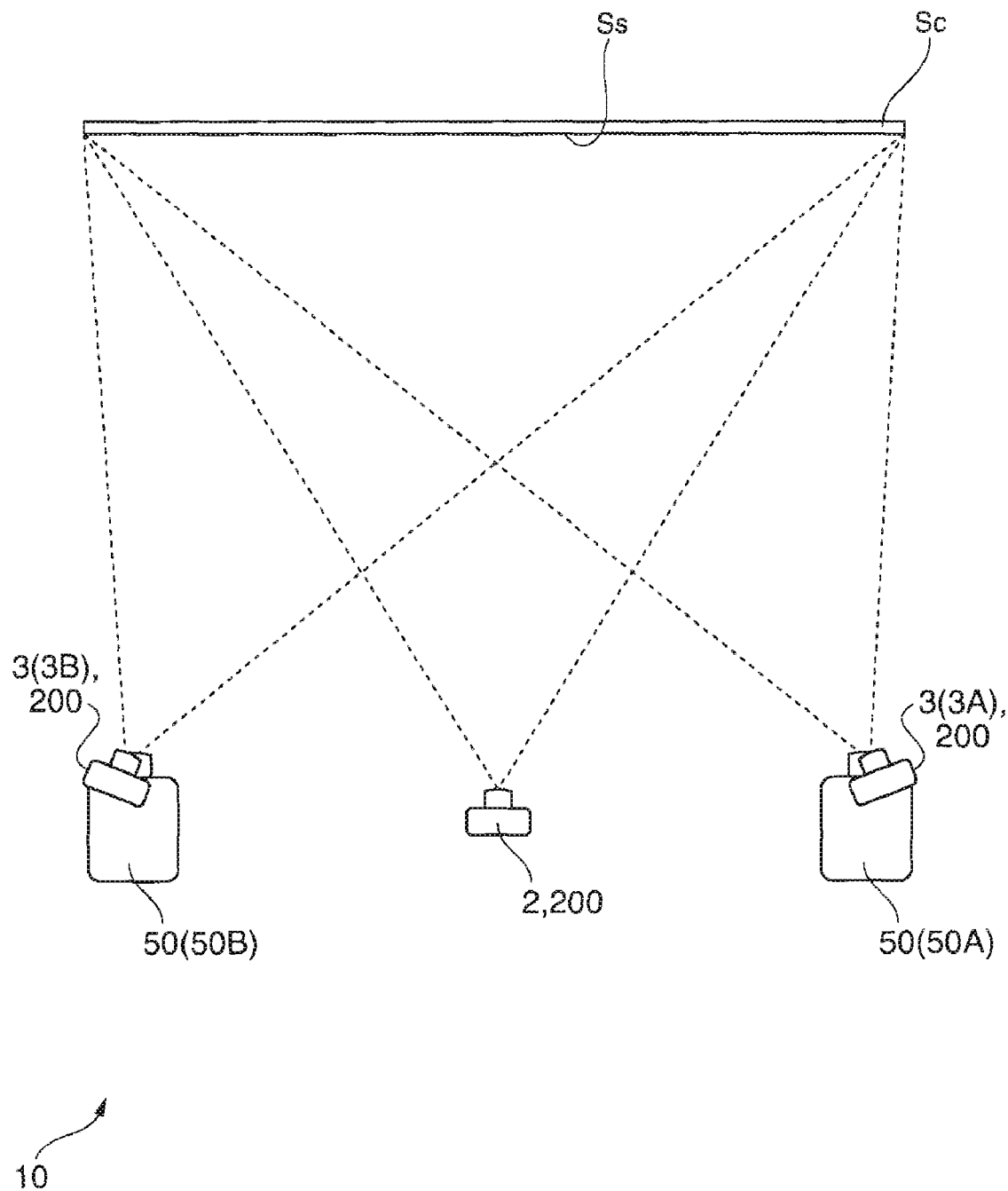
FIG. 11 illustrates a structure of a projection system in a second embodiment.

FIG. 11 illustrates a projection system 10 in the second embodiment.

Figure 12:
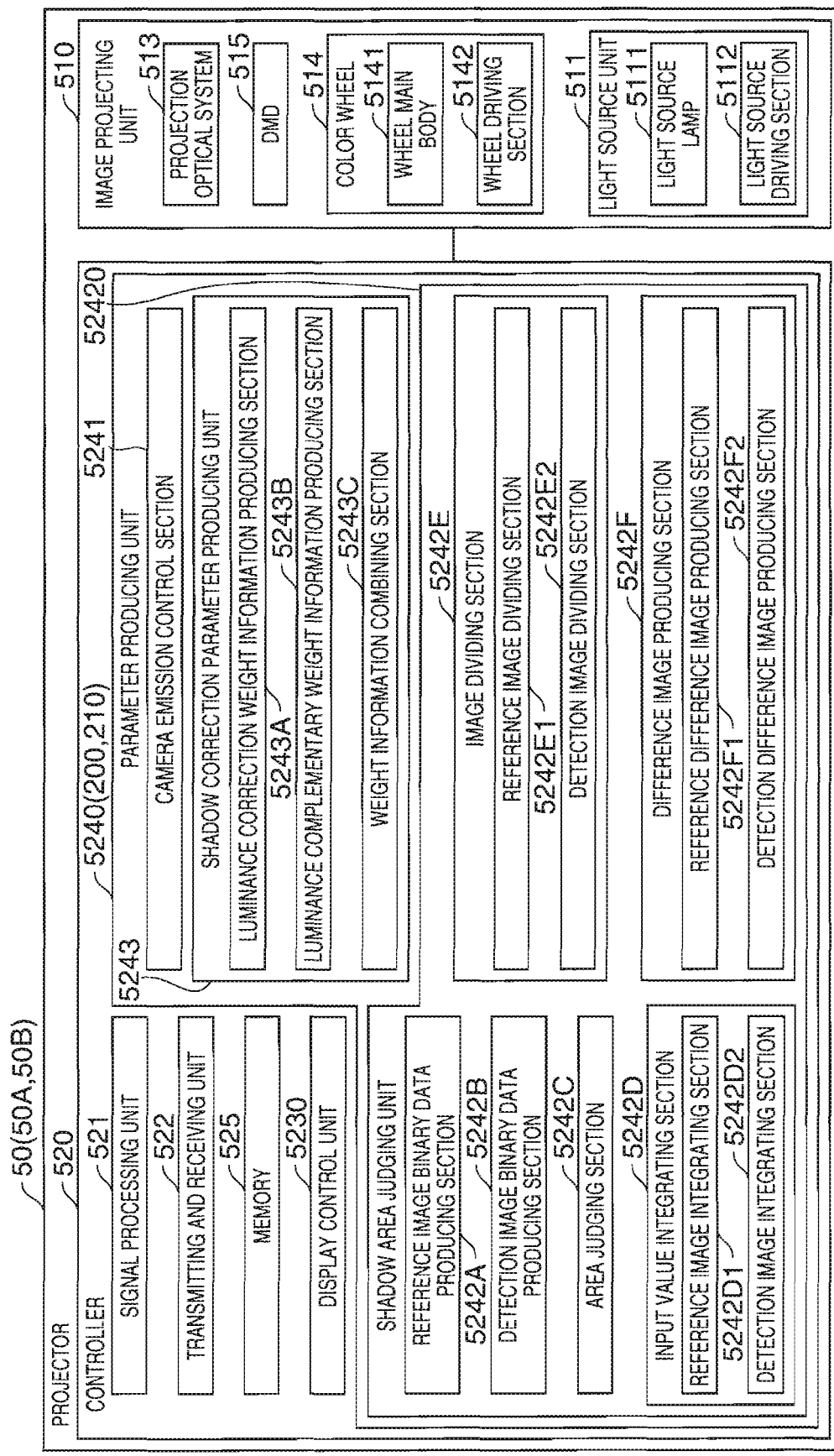
FIG. 12 is a block diagram showing a structure of a projector in the second embodiment.

FIG. 12 is a block diagram showing the structure of projectors 50 (50A and 50B) in the second embodiment.

According to the first embodiment, the reference image pickup device 2 and the respective detection image pickup devices 3 detect infrared light emitted from the respective invisible light emitting devices 4, and the respective projectors 5 virtually obtain the respective projection images projected on the projection surface Ss. Then, the projectors 5 judge the shadow area Sa of the shadow Sh produced on the composed projection image based on the obtained image data. In addition, in the first embodiment which uses the three liquid crystal light valves 512, a color image is formed by synthesizing respective color lights released from the respective liquid crystal light valves 512.

According to the second embodiment, however, the reference image pickup device 2 and the respective detection image pickup devices 3 directly obtain the composed projection image displayed on the projection surface Ss, and judge the shadow area Sa of the shadow Sh produced on the composed projection image based on the obtained image data. More specifically, the second embodiment is different from the first embodiment in that, as illustrated in FIG. 11 or 12, the invisible light emitting devices 4 are eliminated, and that the structure of a parameter producing unit 5240 is modified. In addition, according to the second embodiment, images of the respective colors of red (R), green (G), and blue (B) are switched and displayed with time-sharing system to form a color image. Thus, the second embodiment is different from the first embodiment in that the structure of the image projecting unit 510 and the control structure of the image protecting unit 510 (structure of the control unit 520) are modified. Other structures are the same as those in the first embodiment.

In this embodiment, the reference image pickup device 2 and the respective detection image pickup devices 3 do not have the invisible light transmissive filter discussed in the first embodiment, but detect light in the visible region.

As shown in FIG. 12, the image projecting unit 510 includes a color wheel 514, a DMD 515 as a light modulating element and other components as well as the light source unit 511 and the projection optical system 513 explained in the first embodiment.

The color wheel 514 converts light emitted from the light source lamp 5111 into lights in the wavelength ranges of red, green and blue (hereinafter referred to as red light, green light and blue light). As shown in FIG. 2, the color wheel 514 has a wheel main body 5141 and a wheel driving unit 5142.

Though not specifically shown in the figure, the wheel main body 5141 has a disk shape in the plan view, and is rotatable around a rotation axis positioned at the center in the plan view. The rotation axis is offset from the illumination optical axis of light emitted from the light source lamp 5111. The wheel main body 5141 has a color filter for transmitting red light, a color filter for transmitting green light, and a color filter for transmitting blue light on an annular band portion of the disk shape. These three color filters are sequentially switched by the rotation of the wheel main body 5141 around the rotation axis so that the light emitted from the light source lamp 5111 can be sequentially converted into red light, green light, and blue light.

The wheel driving unit 5142 is constituted by an ordinary motor or the like, and rotates the wheel main body 5141 around the rotation axis at a predetermined frequency under the control of the control unit 520.

The DMD 515 has a number of micro-mirrors for reflecting entering light. The DMD 515 selects the reflection direction of the entering light by varying the inclinations of the micro-mirrors (ON/OFF) according to a driving signal from the controller 520 and gives two-dimensional modulation to the entering light based on the image information. The entering light thus changes into modulated light corresponding to pixels to be projected.

For example, the DMD 515 is formed by integrating a number of movable micro-mirrors on a semiconductor chip by micro-machine technique based on CMOS wafer process. The movable micro-mirrors rotate around a diagonal axis, and are inclined at two predetermined angles ($\pm\theta$) under the bistable condition. The movable micro-mirrors obtain a large light polarization angle of $4\theta$ between the two conditions, and thus execute light switching with preferable S/N ratio.

Light polarized in the direction of $+2\theta$ (under ON condition of micro-mirrors) in the lights entering the DMD 515 is projected by the projection optical system 513 as image light, while light polarized in the direction of $-2\theta$ (under OFF condition of movable micro-mirrors) is absorbed by a not-shown light absorbing member as unnecessary light.

The DMD 515 may be constituted by a digital micro-mirror device (trademark of Texas Instruments Inc.), for example.

As shown in FIG. 12, the control unit 520 includes a display control section 5230 and a parameter producing unit 5240 as well as the signal processing unit 521, the transmitting and receiving unit 522, and the memory 525 discussed in the first embodiment.

The display control section 5230 controls operations of the wheel driving section 5142 and the DMD 515. For example, the display control section 5230 controls the operation of the wheel driving section 5142 such that the wheel main body 5141 can rotate at a constant frequency in synchronization with a synchronizing signal of an image signal inputted via the signal processing unit 521. Under this control, light having entered the wheel main body 5141 sequentially pass therethrough as red light, green light and blue light. The display control section 5230 further executes image data processing similar to the image data processing discussed in the first embodiment to digital image data outputted from the signal processing unit 521. Then, the display control section 5230 produces a driving signal from the processed image data and outputs the driving signal to the DMD 515 to turn on or off the movable micro-mirrors in correspondence with respective pixels of red, green and blue in synchronization with the frequency at which the wheel main body 5141 rotates. Consequently, red, green and blue image lights are released from the DMD 515, and timely mixed to form a color image (so-called field sequential color system).

In this embodiment, it is assumed that the display control section 5230 of the projector 50A forms image lights of red, green blue in this order for producing a color image of one frame by controlling operations of the wheel driving section 5142 and DMD 515. On the other hand, it is assumed that the display control section 5230 of the projector 50B forms image lights of blue, red and green in this order for producing a color image of one frame by controlling operations of the wheel driving section 5142 and DMD 515. Thus, each of the projectors 50 is so constructed as to form image lights of different colors (display colors) during each monochromatic display period at the same instant.

Even executing luminance control process for digital image data, the display control section 5230 changes the time for projecting light as image light by the projection optical system 513 (time for displaying image) and the time for absorbing light by the not-shown absorbing member as unnecessary light (time for displaying no image) by varying the ON/OFF duty ratio of the movable micro-mirrors under plum control.

Similarly, when executing shadow correcting process, the display control section 5230 corrects luminance by varying the ON/OFF duty ratio of the movable micro-mirrors under PWM control based on shadow correction parameters produced by the parameter producing unit 5240.

As shown in FIG. 12, the parameter producing unit 5240 includes a shadow area judging unit 52420 as well as the camera emission control section 5241 and the shadow correction parameter producing unit 5243 discussed in the first embodiment.

In this embodiment, the camera emission control section 5241 controls operations of the reference image pickup device 2 and the detection image pickup devices 3 (detection image pickup device 3A for projector 50A and detection image pickup device 3B for projector 50B) in the shadow correction mode.

As shown in FIG. 12, the shadow area judging unit 52420 has an input value integrating section 5242D, an image dividing section 5242E, and a difference image producing section 5242F as well as the reference image binary data producing section 5242A, the detection image binary data producing section 5242B, and the area judging section 5242C discussed in the first embodiment.

As shown in FIG. 12, the input value integrating section 5242D has a reference image integrating section 5242D1 and a detection image integrating section 5242D2.

The reference image integrating section 5242D1 sequentially receives an electric signal outputted from the reference image pickup device 2 and converts the electric signal into a digital signal to sequentially obtain reference image (reference image data) containing information about pixel value of predetermined luminance (luminance value) for each pixel and integrate luminance value for each corresponding pixel.

The detection image integrating section 5242D2 sequentially receives an electric signal outputted from the detection image pickup device 3 (detection image pickup device 3A for projector 50A and detection image pickup device 3B for projector 50B) and converts the electric signal into a digital signal to sequentially obtain detection image (detection image data) containing information about pixel value (luminance value) of predetermined luminance for each pixel and integrate luminance value for each corresponding pixel.

As shown in FIG. 12, the image dividing section 5242E has a reference image dividing section 5242E1 and a detection image dividing section 5242E2.

The reference image dividing section 5242E1 divides the reference image data integrated by the reference image integrating section 5242D1 for each ⅓ cycle (monochromatic display period) of one frame in synchronization with the frequency at which the wheel main body 5141 is rotated by the display control section 5230 to produce reference image division data.

The detection image dividing section 5242E2 divides the detection image data integrated by the detection image integrating section 5242D2 for each ⅓ cycle (monochromatic display period) of one frame in synchronization with the frequency at which the wheel main body 5141 is rotated by the display control section 5230 to produce detection image division data.

As shown in FIG. 12, the difference image producing section 5242F has a reference difference image producing section 5242F1 and a detection difference image producing section 5242F2.

The reference difference image producing section 5242F1 calculates the difference between the image data of the color component of the display color of the corresponding projector 50 in the digital image data of one frame outputted from the signal processing unit 521 and corresponding to the three reference image division data (digital image data under display) at the time of division of the reference image division data and each of the three reference image division data divided by the reference image dividing section 5242E1. Then, the reference difference image producing section 5242F1 produces respective monochromatic reference difference image data. The reference difference image producing section 5242F1 further integrates luminance value for each corresponding pixel in the produced respective reference difference image data.

The detection difference image producing section 5242F2 calculates the difference between the image data of the color component of the display color of the corresponding projector 50 in the digital image data of one frame outputted from the signal processing unit 521 and corresponding to three detection image division data (digital image data under display) at the time of division of the detection image division data and each of the three detection image division data divided by the detection image dividing section 5242E2. Then, the detection difference image producing section 5242F2 produces respective monochromatic detection difference image data. The detection difference image producing section 5242F2 further integrates luminance value for each corresponding pixel in the respective produced detection difference image data.

In this embodiment, the reference image binary data producing section 5242A produces reference image binary data containing two values determined according to the level (small or large) of luminance value of each pixel based on the reference difference image data produced and integrated by the reference difference image producing section 5242F1 similarly to the first embodiment.

Also, the detection image binary data producing section 5242B produces detection image binary data containing two values determined according to the level (small or large) of luminance value of each pixel based on the detection difference image data produced and integrated by the detection difference image producing section 5242F2 similarly to the first embodiment.

In this structure, the reference image pickup device 2, the two detection image pickup devices 3, and the respective parameter producing units 5240 included in the respective projectors 50 correspond to an image correcting apparatus 200 (FIGS. 11 and 12) according to an aspect of the invention. Also, the respective parameter producing units 5240 included in the respective projectors 50 correspond to correction control devices 210 (FIG. 12) according to an aspect of the invention.

The operation of the projection system 10 having this structure (image correcting method) is now explained with reference to the drawings.

This embodiment is different from the first embodiment only in the shadow area judging process (S6) shown in FIG. 5 in the image correcting method (FIGS. 3, 5 and 8) discussed in the first embodiment, and thus only the shadow area judging process (S6) is explained herein. Since the shadow area judging processes performed by the respective projectors 50 are the same, only the process performed by one of the projectors 50 is discussed. The following shadow area judging process is carried out after the mode is shifted to the shadow correcting mode similarly to the first embodiment. In this condition, image lights are projected by the respective projectors 50, and respective projection images are displayed on the projection surface Ss to form a composed projection image similarly to the normal mode. The position and shape of the obstacle O are the same as those in the first embodiment (FIG. 4).

Figure 13:
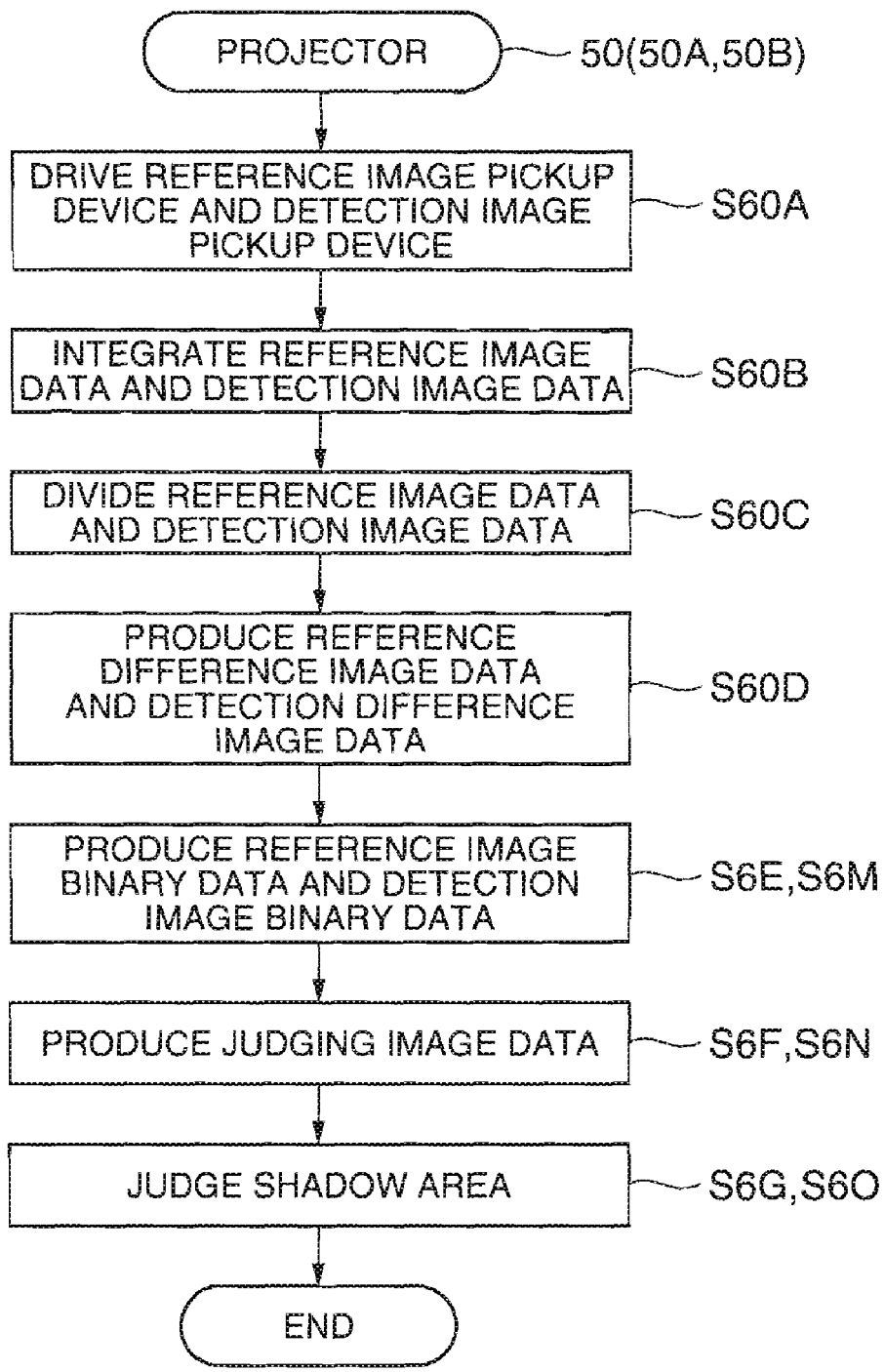
FIG. 13 is a flowchart showing shadow area judging process in the second embodiment.

FIG. 13 is a flowchart showing the shadow area judging process in the second embodiment.

Figure 14:
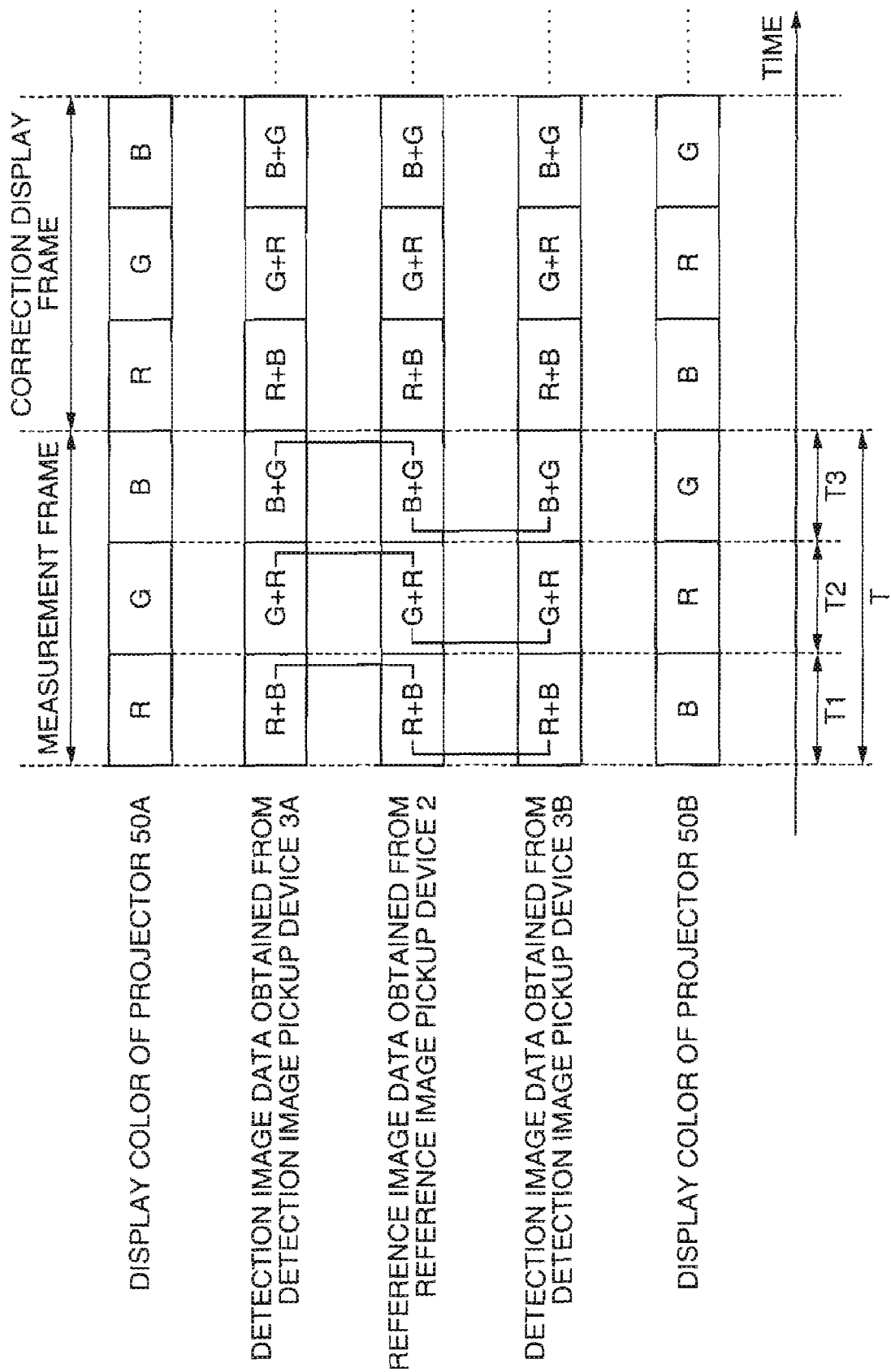
FIG. 14 is a view for explaining the shadow area judging process in the second embodiment.

FIG. 14 is a view for explaining the shadow area judging process.

Initially, the camera emission control section 5241 drives the reference image pickup device 2 and the respective detection image pickup devices 3 for a predetermined period (a period equivalent to a period T for displaying one predetermined frame of a projection image (measurement frame display period T in FIG. 14) or a period longer than the display period T) so that the respective devices 2 and 3 can sequentially obtain an image of the projection surface Ss (composed projection image) in a cycle shorter than that of the monochromatic display periods T1, T2 and T3 (FIG. 14) (step S60A).

After step S60, the reference image integrating section 5242D1 sequentially receives an electric signal outputted from the reference image pickup device 2 and converts the electric signal to a digital signal. Then, the reference image integrating section 5242D1 sequentially obtains reference image data containing information about pixel value of predetermined luminance (luminance value) for each pixel, and integrates luminance value for each corresponding pixel (step S60B). As described above, the respective projectors 50 are so constructed as to form image lights of different colors for each of the monochromatic display periods T1, T2 and T3 at the same instant. More specifically, as illustrated in FIG. 14, image light of red (R) is formed by the projector 50A (display color: red (R)), and image light of blue (B) is formed by the projector 50B (display color: blue (B)) Thus, as illustrated in FIG. 14, the reference image data produced by integration by the reference image integrating section 5242D1 for the first monochromatic display period T1 of the measurement frame (reference image data obtained from the reference image pickup device 2 in FIG. 14) contains color components of "R+B" as a combination of the display color (R) of the projector 50A and the display color (B) of the projector 50B. As illustrated in FIG. 14, the reference image data integrated by the reference image integrating section 5242D1 for the second monochromatic display period T2 of the measurement frame contains color components of "G+R" as a combination of the display color (G) of the projector 50A and the display color (R) of the projector 50B. As illustrated in FIG. 14, the reference image data produced by integration of the reference image integrating section 5242D1 for the last monochromatic display period T3 of the measurement frame contains color components of "B+G" as a combination of the display color (B) of the projector 50A and the display color (G) of the projector 50B.

After step S60A, the detection image integrating section 5242D2 sequentially receives an electric signal outputted from the detection image pickup device 3 (detection image pickup device 3A for projector 50A and detection image pickup device 3B for projector 5B) and converts the electric signal to a digital signal. Then, the detection image integrating section 5242D2 sequentially obtains detection image data containing information about pixel value of predetermined luminance (luminance value) for each pixel, and integrates luminance value for each corresponding pixel (step S60B). As illustrated in FIG. 14, the respective detection image data produced by integration by the detection image integrating section 5242D2 for the respective monochromatic display periods T1, T2 and T3 of the measurement frame (detection image data obtained from the detection image pickup device 3A and detection image data obtained from the detection image pickup device 3B in FIG. 14) contains color components of "R+B", "G+R", and "B+G", respectively, similarly to the reference image data discussed above.

After step S60B, the reference image dividing section 5242E1 divides the reference image data integrated for each ⅓ cycle of the measurement frame (monochromatic display period T1, T2 or T3) in synchronization with the frequency at which the wheel main body 5141 is rotated by the display control unit 5230 in step S60B, and produces reference image division data (step S60C). More specifically, the reference image dividing section 5242E1 produces reference image division data containing color components of "R+B" for the monochromatic display period T1 (hereinafter referred to as first reference image division data), reference image division data containing color components of "G+R" for the monochromatic display period T2 (hereinafter referred to as second reference image division data), and reference image division data containing color components of "B+G" for the monochromatic display period T3 (hereinafter referred to as third reference image division data).

After step S60B, the detection image dividing section 5242E2 divides the detection image data integrated for each ⅓ cycle of the measurement frame (monochromatic display period T1, T2 or T3) in synchronization with the frequency at which the wheel main body 5141 is rotated by the display control unit 5230 in step S60B, and produces detection image division data (step S60C). More specifically, the detection image dividing section 5242E2 produces detection image division data containing color components of "R+B" for the monochromatic display period T1 (hereinafter referred to as first detection image division data), detection image division data containing color components of "G+R" for the monochromatic display period T2 (hereinafter referred to as second detection image division data), and detection image division data containing color components of "B+G" for the monochromatic display period T3 (hereinafter referred to as third detection image division data).

After step S60C, the difference image producing section 5242F produces reference difference image data and detection difference image data based on the respective reference image division data, the respective detection image division data, and the digital image data of the measurement frame of the corresponding projector 50 under display in step S60C (step S60D).

More specifically, the projector 50A produces the reference difference image data in the following manner.

The reference difference image producing section 5242F1 calculates the difference between the first reference image division data and the image data of the color component of the display color (R) for the monochromatic display period T1 in the digital image data of the measurement frame of the corresponding projector 50A under display, and produces reference difference image data (hereinafter referred to as first reference difference image data). Since the first reference difference image data is produced by calculating the difference between the first reference image division data containing the component of "R+B" and the image data of the color component of "R", the first reference difference image data is substantially equivalent to image data of color component of "B", that is, image data corresponding to a projection image (display color (B)) projected on the projection surface Ss from the projector 50B for the monochromatic display period T1 and obtained from the chief audience position. The reference difference image producing section 5242F1 further calculates the difference between the second reference image division data and the image data of the color component of the display color (G) for the monochromatic display period T2 in the digital image data of the measurement frame of the corresponding projector 50A under display, and produces reference difference image data (hereinafter referred to as second reference difference image data) as image data of the color component "R" (image data substantially equivalent to image data corresponding to a projection image (display color (R)) projected on the projection surface Ss from the projector 50B for the monochromatic display period T2 and obtained from the chief audience position. The reference difference image producing section 5242F1 further calculates the difference between the third reference image division data and the image data of the color component of theft display color (B) for the monochromatic display period T3 in the digital image data of the measurement frame of the corresponding projector 50A under display, and produces reference difference image data (hereinafter referred to as third reference difference image data) as image data of the color component "G" (image data substantially equivalent to image data corresponding to a projection image (display color (G)) projected on the projection surface Ss from the projector 50B for the monochromatic display period T3 and obtained from the chief audience position.

Then, the reference difference image producing section 5242F1 integrates luminance value for each corresponding pixel based on the produced respective reference difference image data (first reference difference image data, second reference difference image data, and third reference difference image data) to appropriately judge the level (large or small) of luminance and create binary data.

Accordingly, the respective reference difference image data is substantially equivalent to the image data corresponding to the projection image projected on the projection surface Ss from the projector 50B and obtained from the chief audience position. Thus, the image corresponding to the image data produced by integrating the respective reference difference image data is substantially equivalent to the reference image FrA (FIG. 6) discussed in the first embodiment.

The projector 50B produces the reference difference image data similarly to the above process.

More specifically, the reference difference image producing section 5242F1 produces first reference difference image data as image data of the color component "R" (image data substantially equivalent to image data corresponding to a projection image (display color (R)) projected on the projection surface Ss from the projector 50A for the monochromatic display period T1 and obtained from the chief audience position. The reference difference image producing section 5242F1 further produces second reference difference image data as image data of the color component "G" (image data substantially equivalent to image data corresponding to a projection image (display color (G)) projected on the projection surface Ss from the projector 50A for the monochromatic display period T2 and obtained from the chief audience position. The reference difference image producing section 5242F1 further produces third reference difference image data as image data of the color component "B" (image data substantially equivalent to image data corresponding to a projection image (display color (B)) projected on the projection surface Ss from the projector 50A for the monochromatic display period T3 and obtained from the chief audience position.

Then, the reference difference image producing section 5242F1 integrates luminance value for each corresponding pixel based on the produced respective reference difference image data (first reference difference image data, second reference difference image data, and third reference difference image data) to appropriately judge the level (small or large) of luminance and create binary data.

Accordingly, the respective reference difference image data is substantially equivalent to the image data corresponding to the projection image projected on the projection surface Ss from the projector 50A and obtained from the chief audience position. Thus, the image corresponding to the image data produced by integrating the respective reference difference image data is substantially equivalent to the reference image FrB (FIG. 7) discussed in the first embodiment.

The projector 50A produces the detection difference image data in the following manner substantially similar to creation of the above reference difference image data.

The detection difference image producing section 5242F2 calculates the difference between the first detection image division data and the image data of the color component of the display color (R) for the monochromatic display period T1 in the digital image data of the measurement frame of the corresponding projector 50A under display, and produces detection difference image data (hereinafter referred to as first detection difference image data). Since the first detection difference image data is produced by calculating the difference between the first detection image division data containing the component of "R+B" and the image data of the color component of "R", the first detection difference image data is substantially equivalent to image data of color component of "B", that is, image data corresponding to a projection image (display color (B)) projected on the projection surface Ss from the projector 50B for the monochromatic display period T1 and obtained from the position of the projector 50A. The detection difference image producing section 5242F2 further calculates the difference between the second detection image division data and the image data of the color component of the display color (G) for the monochromatic display period T2 in the digital image data of the measurement frame of the corresponding projector 50A under display, and produces detection difference image data hereinafter referred to as second detection difference image data) as image data of the color component "R" (image data substantially equivalent to image data corresponding to a projection image (display color (R)) projected on the projection surface Ss from the projector 50B for the monochromatic display period T2 and obtained from the position of the projector 50A. The detection difference image producing section 5242F2 further calculates the difference between the third detection image division data and the image data of the color component of the display color (B) for the monochromatic display period T3 in the digital image data of the measurement frame of the corresponding projector 50A under display, and produces detection difference image data (hereinafter referred to as third detection difference image data) as image data of the color component "G" (image data substantially equivalent to image data corresponding to a projection image (display color (G)) projected on the projection surface Ss from the projector 50B for the monochromatic display period T3 and obtained from the position of the projector 50A.

Then, the detection difference image producing section 5242F2 integrates luminance value for each pair of corresponding pixels based on the produced respective detection difference image data (first detection difference image data, second detection difference image data, and third detection difference image data) to appropriately judge the level (high or low) of luminance and create binary data.

Accordingly, the respective detection difference image data is substantially equivalent to the image data corresponding to the projection image projected on the projection surface Ss from the projector 50B and obtained from the position of the projector 50A. Thus, the image corresponding to the image data produced by integrating the respective detection difference image data is substantially equivalent to the detection image FdA (FIG. 6) discussed in the first embodiment.

The projector 50B produces the detection difference image data similarly to the above process.

More specifically, the detection difference image producing sect on 5242F2 produces first detection difference image data as image data of the color component "B" (image data substantially equivalent to image data corresponding to a projection image (display color (B)) projected on the projection surface Ss from the projector 50A for the monochromatic display period T1 and obtained from the position of the projector 50B. The detection difference image producing section 5242F2 further produces second detection difference image data as image data of the color component "R" (image data substantially equivalent to image data corresponding to a projection image (display color (R)) projected on the projection surface Ss from the projector 50A for the monochromatic display period T2 and obtained from the position of the projector 50B. The detection difference image producing section 5242F2 further produces third detection difference image data as image data of the color component "G" (image data substantially equivalent to image data corresponding to a projection image (display color (G)) projected on the projection surface Ss from the projector 50A for the monochromatic display period T3 and obtained from the position of the projector 50B.

Then, the detection difference image producing section 5242F2 integrates luminance value for each corresponding pixel based on the produced respective detection difference image data (first detection difference image data, second detection difference image data, and third detection difference image data) to appropriately judge the level (small or large) of luminance and create binary data.

Accordingly, the respective detection difference image data is substantially equivalent to the image data corresponding to the projection image projected on the projection surface Ss from the projector 50A and obtained from the position of the projector 50B. Thus, the image corresponding to the image data produced by integrating the respective detection difference image data is substantially equivalent to the detection image FdB (FIG. 7) discussed in the first embodiment.

After step S60D, each of the projectors 50 produces reference image binary data and detection image binary data similarly to the first embodiment (steps S6E, 6M).

More specifically, the projector 50A produces the reference image binary data and the detection image binary data in the following manner.

The reference image binary data producing section 5242A produces the reference image binary data similar to that of the first embodiment by executing the process similar to that in the step S6E discussed in the first embodiment based on the image data produced by integrating the respective reference difference image data (image data substantially similar to the reference image FrA (FIG. 6)).

The detection image binary data producing section 5242B produces the detection image binary data similar to that of the first embodiment by executing the process similar to that in the step S6E discussed in the first embodiment based on the image data produced by integrating the respective detection difference image data (image data substantially similar to the detection image FdA (FIG. 6)).

In addition, the projector 50B produces the reference image binary data and the detection image binary data in the following manner.

The reference image binary data producing section 5242A produces the reference image binary data similar to that of the first embodiment by executing the process similar to that in the stem S6M discussed in first embodiment based on the image data produced by integrating the respective reference difference image data (image data substantially similar to the reference image FrB (FIG. 7)).

The detection image binary data producing section 5242B produces the detection image binary data similar to that of the first embodiment by executing the process similar to that in the step S6M discussed in the first embodiment based on the image data produced by integrating the respective detection difference image data (image data substantially similar to the detection image FdB (FIG. 7)).

After steps S6E and S6M, the respective protectors 50 produce judging image data similarly to the first embodiment (steps S6F, S6N) to judge the shadow area (steps S6G, S6O).

According to this embodiment, in the subsequent step S8, the display control sections 5230 of the respective projectors 50 vary the ON/OFF duty ratio of the movable micro-mirrors under PWM control based on the shadow correcting parameters substantially similar to those in the first embodiment produced by the parameter producing unit 5240 in the frame subsequent to the measurement frame (correction display frame in FIG. 14) to execute shadow correction process for correcting luminance.

The second embodiment discussed above offers the following advantages as well as those provided in the first embodiment.

In this embodiment, the respective projectors 50 display images of respective colors with time-sharing system such that images of different colors for each projector 50 can be displayed in each of the monochromatic display periods T1, T2 and T3. The shadow area judging unit 52420 has the image dividing section 5242E and the difference image producing section 5242F. In this case, the reference difference image producing section 5242F1 of the shadow area judging unit 52420 of the projector 50A calculates the difference between the reference image divided by the reference image dividing section 5242E1, that is, the image containing both the display color of the projector 50A and the display color of the projector 50B in each of the monochromatic display periods T1, T2 and T3, and the image corresponding to the display color displayed by the projector 50A in each of the monochromatic display periods T1, T2 and T3 to produce the reference difference image as an image containing only the display color of the projector 50B. Thus, the produced reference difference image is substantially equivalent to the image corresponding to the projection image projected on the projection surface Ss from the projector 50B and obtained by the reference image pickup device 2 in each of the monochromatic display periods T1, T2 and T3. Similarly, the detection difference image produced by the detection difference image producing section 5242F2 is substantially equivalent to the image corresponding to the projection image projected on the projection surface Ss from the projector 50B and obtained by the detection image pickup device 3A disposed close to the projector 53A in each of the monochromatic display periods T1, T2 and T3. Thus, the shadow area judging unit 52420 of the projector 50A can judge the shadow area Sa produced on the projection image projected on the projection surface Ss from the projector 50B based on the reference difference image and the detection difference image. Similarly, the shadow area judging unit 52420 of the projector 50B can judge the shadow area Sa produced on the projection image projected on the projection surface Ss from the projector 50A based on the reference difference image and the detection difference image (in this embodiment, it is judged that no shadow area exists). Thus, the projection system 10 directly obtains the projection image projected on the projection surface Ss from the respective projectors 50, and judges the shadow area based on the obtained image. As a result, the structure of the projection system 10 can be simplified without necessity for using the invisible light emitting devices 4 explained in the first embodiment.

According to the respective projectors 50 discussed above, the DMD 515 is turned on or off under PWM control. Thus, the period for displaying image and the period for displaying no image are mixed in each of the monochromatic periods T1, T2 and T3. Thus, in the structure having no input value integrating section 5242D, where the reference image dividing section 5242E1 and the detection image dividing section 5242E2 directly acquire the reference image obtained by the reference image pickup device 2 and the detection image obtained by the detection image pickup device 3, there is a possibility that the reference image dividing section 5242E1 and the detection image dividing section 5242E2 acquire the reference image and detection image obtained during the period for displaying no image in each of the monochromatic periods T1, T2 and T3.

In this embodiment, the input value integrating section 5242D included in the shadow area judging unit 52420 integrates the respective images obtained during the period for displaying image and the period for displaying no image in each of the monochromatic periods T1, T2 and T3. Thus, the reference image dividing section 5242E1 and detection image dividing section 5242E2 can securely obtain the reference image and detection image obtained during the period for displaying image in each of the monochromatic periods T1, T2 and T3.

It is intended that the invention should not be limited to the particular embodiments described and depicted herein, and that the invention will include all modifications, improvements and the like falling within the scope of the invention.

In the above embodiments, the correction control devices 110 and 210 (respective parameter producing units 524 and 5240) as components of the image correcting apparatuses 100 and 200 are included in the respective projectors 5 and 50. However, the image correcting apparatuses 100 and 200 may be components separated from the respective projectors 5 and 50, that is, the correction control devices 110 and 210 may be constituted by personal computers or the like, for example. In this case, the correction control devices 110 and 210 are connected with the respective projectors 5 and 50 such that information is mutually transmittable and receivable, and the shadow correction parameters are transmitted from the correction control devices 110 and 210 to the respective projectors 5 and 50 so that the respective projectors 5 and 50 can perform the shadow correction process based on the shadow correction parameters.

In the above embodiments, the obstacle O lies on the projection optical path between the projectors 5B or 50B and the projection surface Ss as illustrated in FIG. 4 as an example. However, degradation of the composed projection image due to generation of the shadow Sh can be prevented even when the obstacle O is located at a position different from the position in the embodiments.

Figure 15:
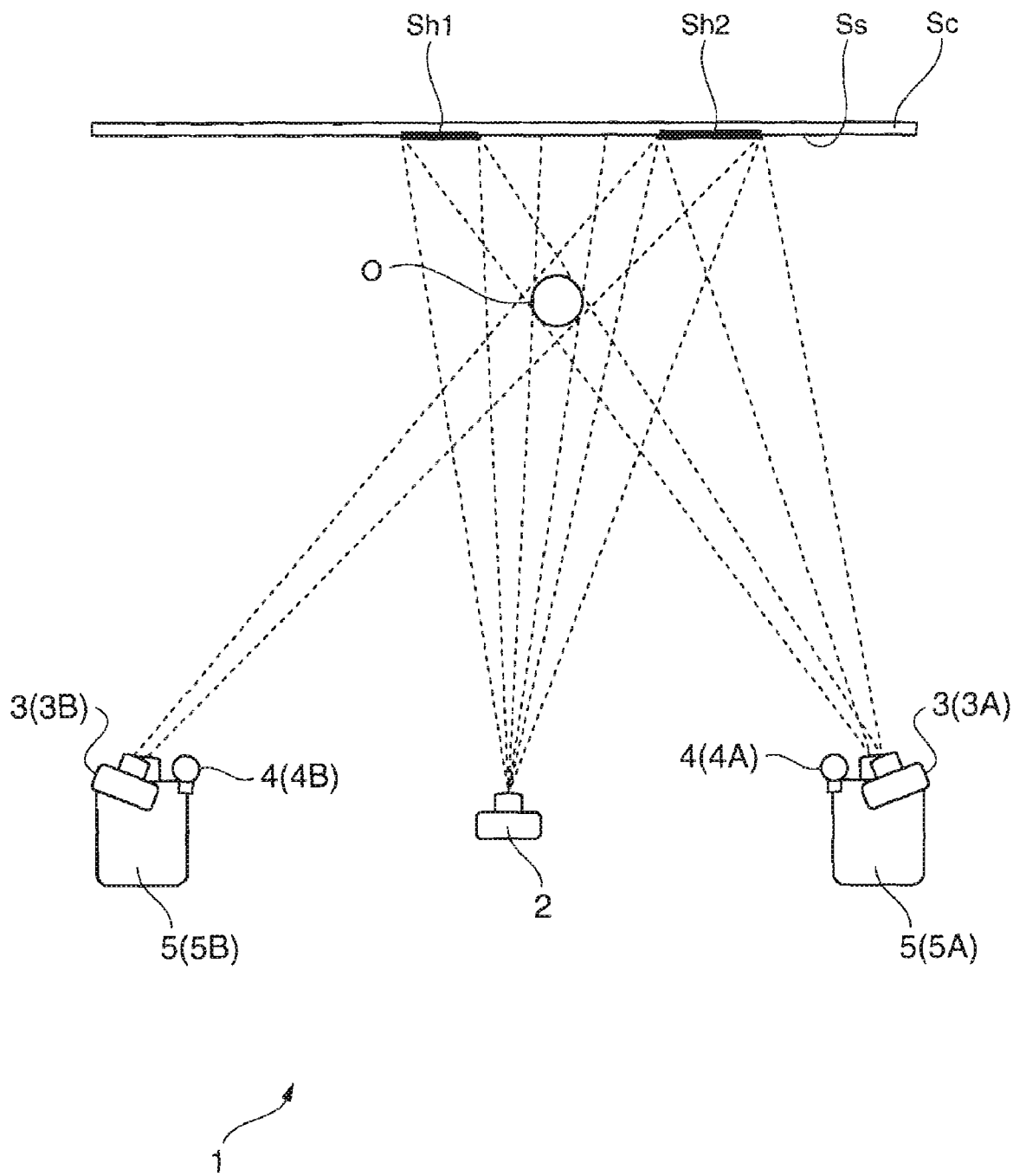
FIG. 15 illustrates a modified example of the first and second embodiments.
Figure 16:
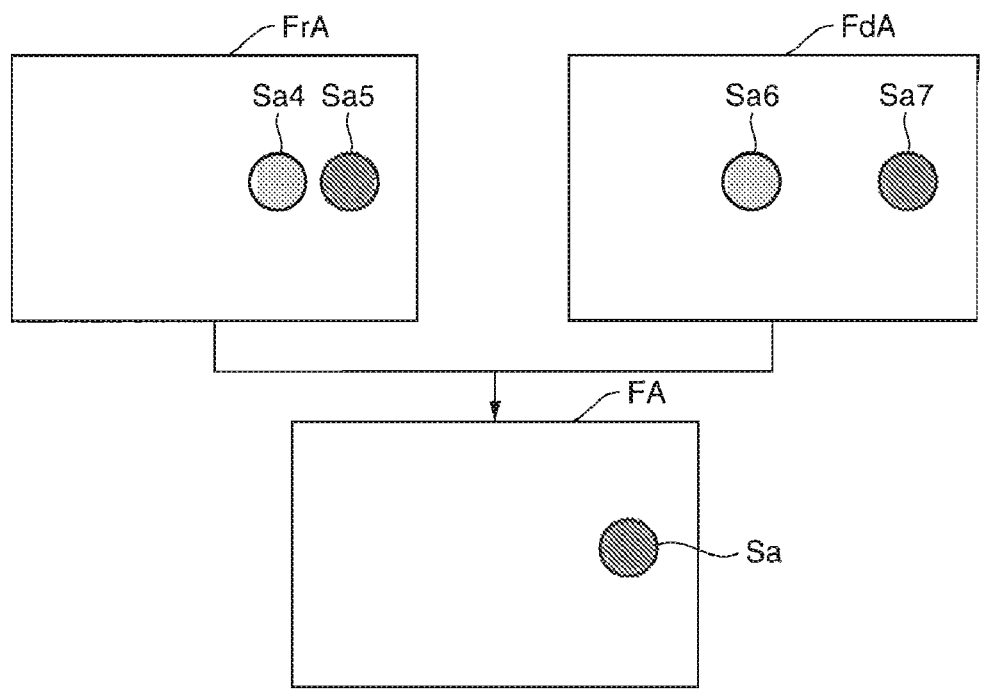
FIG. 16 illustrates the modified example of the first and second embodiments.
Figure 17:
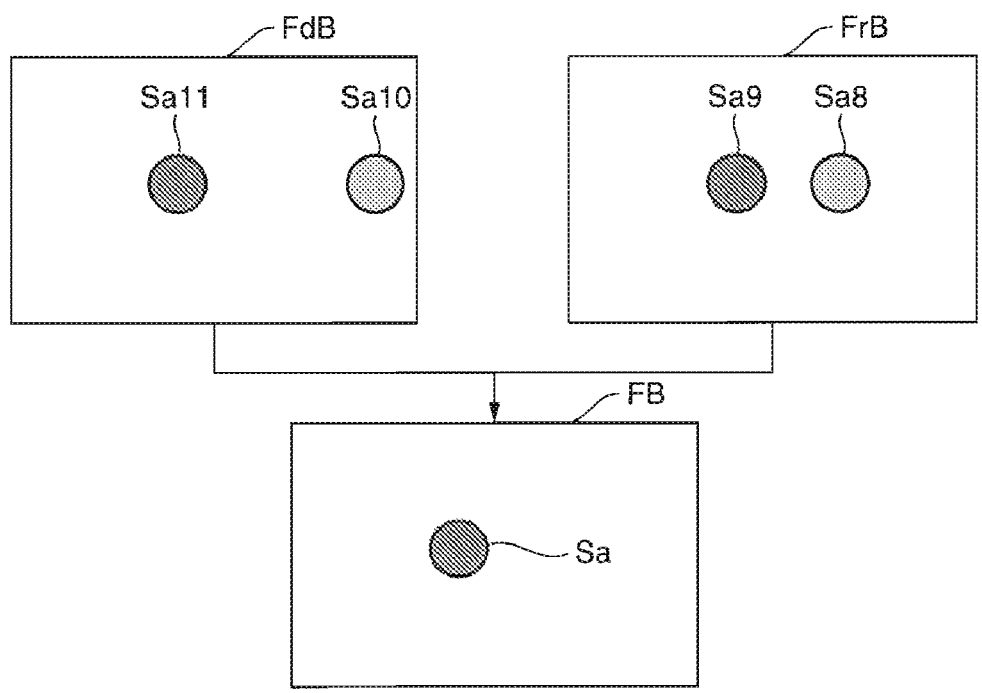
FIG. 17 illustrates the modified example of the first and second embodiments.

FIGS. 15 through 19 illustrate a modified example of the above embodiments. More specifically, FIG. 15 corresponds to FIG. 4, showing the position of the obstacle O. FIGS. 16 and 17 correspond to FIGS. 6 and 7 discussed in the above embodiments, explaining the shadow area judging process.

Figure 18:
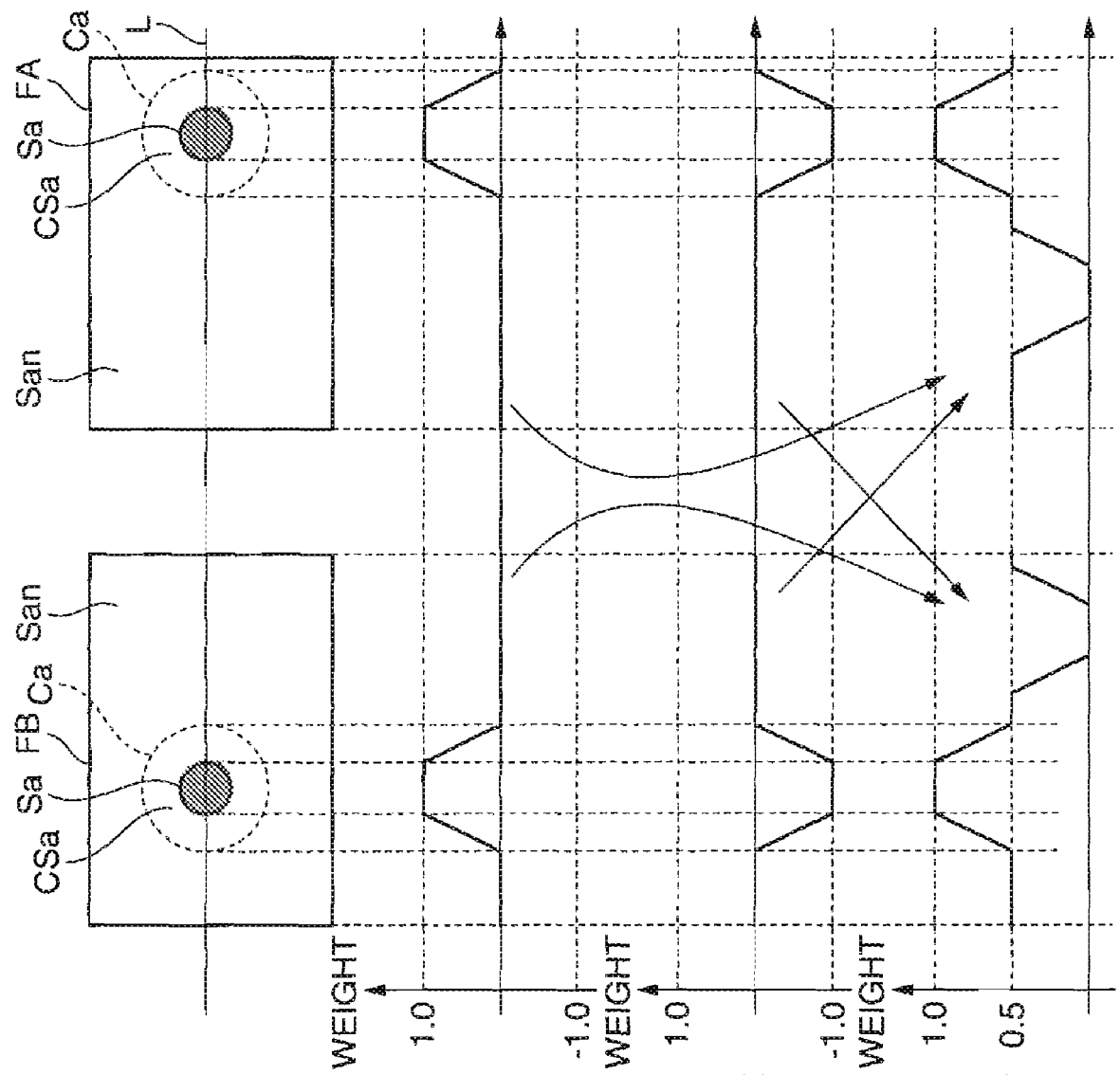
FIG. 18 illustrates the modified example of the first and second embodiments.
Figure 19:
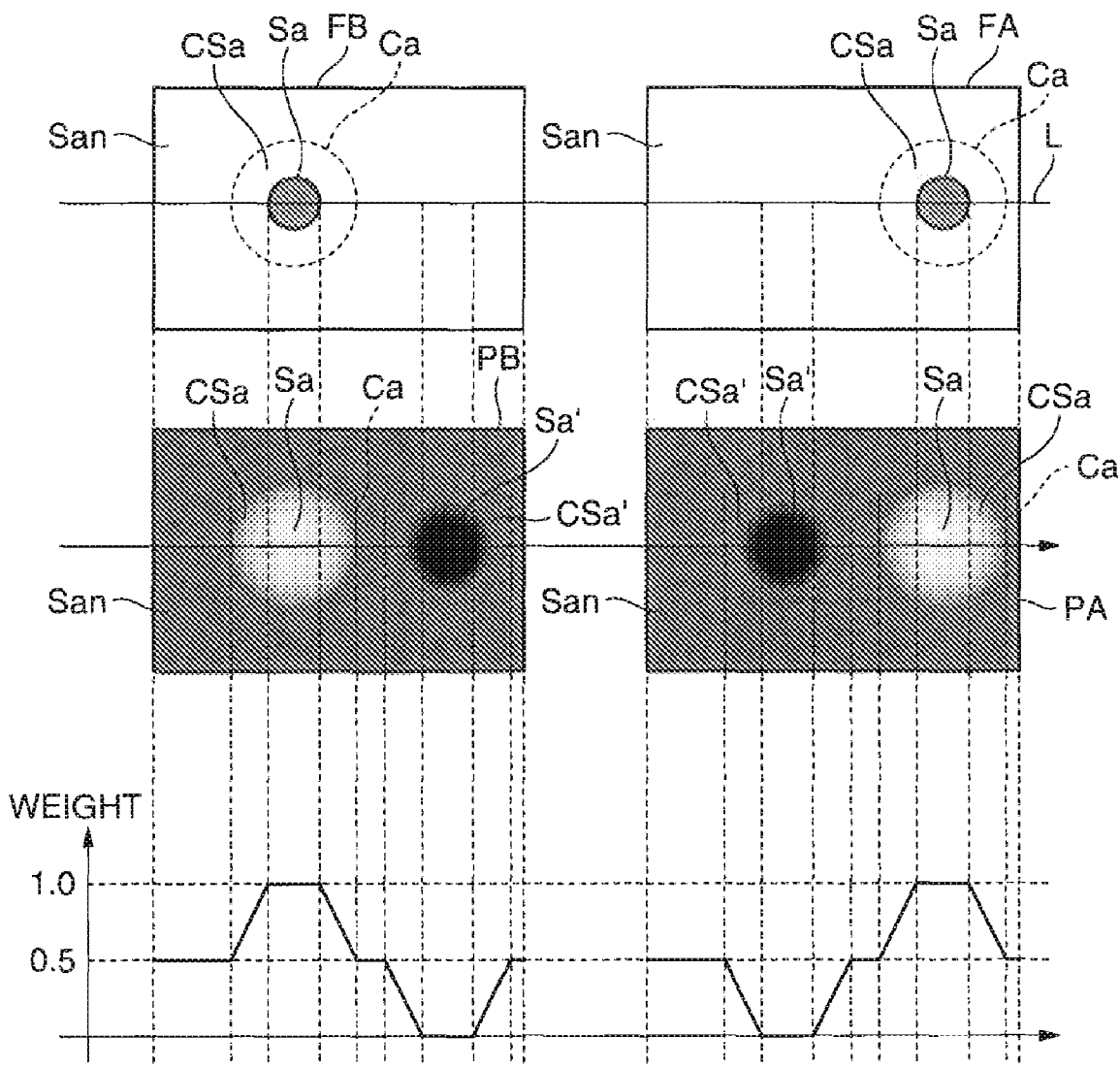
FIG. 19 illustrates the modified example of the first and second embodiments.

FIGS. 18 and 19 correspond to FIGS. 9 and 10 discussed in the above embodiments, explaining the shadow correction parameter producing process.

The structure in this modified example uses the structure of the first embodiment, but the structure of the second embodiment may be similarly used.

For example, it is assumed that the obstacle O lies on both projection optical paths between the projector 5A and the projection surface Ss and between the projector 5B and the projection surface Ss as illustrated in FIG. 15. In this condition, the obstacle O blocks a part of an image projected from the projector 5A and a part of an image projected from the projector 5B, producing shadows Sh1 and Sh2 on a composed projection image, respectively. It is also assumed that the obstacle O exists on the camera vision of the reference image pickup device 2.

Initially, the projector 5A judges the shadow area by executing steps S6A through S6G of the shadow area judging step S6 in the following manner.

In step S6E, the shadow area judging unit 5242 recognizes luminance value for each pixel based on the reference image data (reference image FrA) as illustrated in FIG. 16, and produces reference image binary data containing two values of "0" for pixels within an expected shadow area Sa4 as a false shadow area only generated when the projection surface Ss is blocked by the obstacle O on the camera vision of the reference image pickup device 2 (pixels having small luminance value) and for pixels within an expected shadow area Sa5 as a true shadow area on the projection surface Ss generated when a part of infrared light from the invisible light emitting device 4B is blocked by the obstacle O (pixels having small luminance value), and "1" for pixels in the area other than the expected shadow areas Sa4 and Sa5 (pixels having large luminance value).

Also, in step S6E, the shadow area judging unit 5242 recognizes luminance value for each pixel based on the detection image data (detection image FdA) as illustrated in FIG. 16, and produces detection image binary data containing two values of "0" for pixels within an expected shadow area Sa6 as a false shadow area only generated when the projection surface Ss is blocked by the obstacle O on the camera vision of the detection image pickup device 3A (pixels having small luminance value) and for pixels within an expected shadow area Sa7 as a true shadow area on the projection surface Ss generated when a part of infrared light from the invisible light emitting device 4B is blocked by the obstacle O (pixels having small luminance value), and "1" for pixels in the area other than the expected shadow areas Sa6 and Sa7 (pixels having large luminance value).

In the reference image FrA and the detection image FdA, only the expected shadow areas Sa5 and Sa7 in the respective expected shadow areas Sa4 through Sa7 are located at the same positions. Thus, in steps S6F and S6G, the shadow area judging unit 5242 calculates the theoretical sum of the reference image binary data and the detection image binary data for each pair of corresponding pixels. Then, the shadow area judging unit 5242 produces judging image data (judging image FA) determining each pixel as "0" in an area Sa corresponding to the expected shadow areas Sa5 and Sa7 and each pixel as "1" in the other area, and judges the area Sa as the shadow area based on the judging image data.

On the other hand, the protector 5B judges the shadow area by executing steps S6H through S6O of the shadow area judging step S6 in the following manner.

In step S6M, the shadow area judging unit 5242 recognizes luminance value for each pixel based on the reference image data (reference image FrB) as illustrated in FIG. 17, and produces reference image binary data containing two values of "0" for pixels within an expected shadow area Sa8 as a false shadow area only generated when the projection surface Ss is blocked by the obstacle O on the camera vision of the reference image pickup device 2 (pixels having small luminance value) and for pixels within an expected shadow area Sa9 as a true shadow area on the projection surface Ss generated when a part of infrared light from the invisible light emitting device 4A is blocked by the obstacle O (pixels having small luminance value), and "1" for pixels in the area other than the expected shadow areas Sa8 and Sa9 (pixels having large luminance value).

Also, in step S6M, the shadow area judging unit 5242 recognizes luminance value for each pixel based on the detection image data (detection image FdB) as illustrated in FIG. 17, and produces detection image binary data containing two values of "0" for pixels within an expected shadow area Sa10 as a false shadow area only generated when the projection surface Ss is blocked by the obstacle O on the camera vision of the detection image pickup device 3B (pixels having small luminance value) and for pixels within an expected shadow area Sa11 as a true shadow area on the projection surface Ss generated when a part of infrared light from the invisible light emitting device 4A is blocked by the obstacle O (pixels having small luminance value), and "1" for pixels in the area other than the expected shadow areas Sa10 and Sa11 (pixels having large luminance value).

In the reference image FrB and the detection image FdB, only the expected shadow areas Sa9 and Sa11 in the respective expected shadow areas Sa8 through Sa11 are located at the same positions. Thus, in steps S6N and S6O, the shadow area judging unit 5242 calculates the theoretical sum of the reference binary data and the detection image binary data for each pair of corresponding pixels. Then, the shadow area judging unit 5242 produces judging image data (judging image FB) determining each pixel as "0" in an area Sa corresponding to the expected shadow areas Sa9 and Sa11 and each pixel as "1" in the other area, and judges the area Sa as the shadow area based on the judging image data.

Then, the projector 5A produces shadow correction parameters in the shadow correction parameter producing step S7 in the following manner.

As illustrated in FIGS. 18 and 19, the shadow correction parameter producing unit 5243 determines the weight of each pixel in the shadow area Sa as weight "1", the weight of each pixel in the non-shadow area San as weight "0.5", and the weight of each pixel in the correction shadow area CSa as weight gradually changing from the weight "1" of each pixel in the shadow area Sa to the weight "0.5" of each pixel in the non-shadow area San as the position of the weight shifts from the shadow area Sa to the non-shadow area San for the judging image FA. Also, as illustrated in FIGS. 18 and 19, the shadow correction parameter producing unit 5243 determines the weight of each pixel in an area Sa' corresponding to the shadow area Sa of the judging image FB as weight "0", and the weight of each pixel in an area CSa' corresponding to the correction shadow area CSa of the judging image FB as weight gradually changing from the weight "0" of each pixel in the area Sa' to the weight "0.5" of each pixel in the non-shadow area San as the position of the weight shifts from the area Sa' to the non-shadow area San for the judging image FA. The shadow correction parameter producing unit 5243 produces the shadow correction parameters containing information about weight for each pixel by this method.

On the other hand, the projector 5B produces shadow correction parameters in the shadow correction parameter producing step S7 in the following manner.

As illustrated in FIGS. 18 and 19, the shadow correction parameter producing unit 5243 determines the weight of each pixel in the shadow area Sa as weight "1", the weight of each pixel in the non-shadow area San as weight "0.5", and the weight of each pixel of the correction shadow area CSa as weight gradually changing from the weight "1" of each pixel in the shadow area Sa to the weight "0.5" of each pixel in the non-shadow area San as the position of the weight shifts from the shadow area Sa to the non-shadow area San for the judging image FB. Also, as illustrated in FIGS. 18 and 19, the shadow correction parameter producing unit 5243 determines the weight of each pixel in the area Sa' corresponding to the shadow area Sa of the judging image FA as weight "0", and the weight of each pixel in the area CSa' corresponding to the correction shadow area CSa of the judging image FA as weight gradually changing from the weight "0" of each pixel in the area Sa' to the weight "0.5" of each pixel in the non-shadow area San as the position of the weight shifts from the area Sa' to the non-shadow area San for the judging image FB. The shadow correction parameter producing unit 5243 produces the shadow correction parameters containing information about weight for each pixel by this method.

By executing the shadow correcting process based on the respective shadow correction parameters thus produced, each of the respective projectors 5 indicates the area containing neither shadow Sh1 nor shadow Sh2 (area corresponding to non-shadow area San) by half luminance vale of the full luminance of the composed projection image, thereby indicating that area by the luminance value having the full luminance of the composed projection image in total. For the composed projection image displayed on the projection surface Ss, each of the projectors 5B and 5A indicates the area containing the shadows Sh1 and Sh2 (area corresponding to shadow area Sa) by the luminance value having the full luminance of the composed protection image. Also, each of the projectors 5A and 5B indicates the area containing the shadows Sh1 and Sh2 (area corresponding to area Sa') by luminance value of zero, that is, no display is provided. In this case, a part of image light projected from the projectors 5A and 5B is not reflected by the obstacle O.

In the above embodiment, the shadow correction parameter producing unit 5243 establishes the substantially circular area containing the shadow area Sa as the correction area Ca. However, the shape is not limited to a circular shape.

Figure 20:
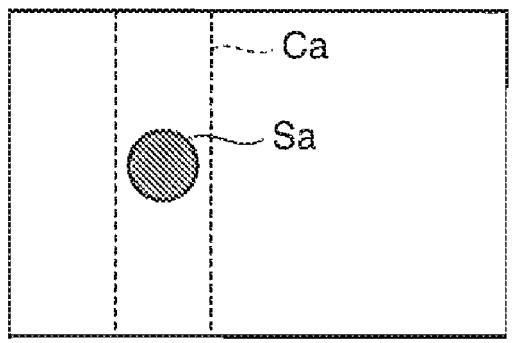
FIG. 20 illustrates a modified example of the first and second embodiments.
Figure 21:
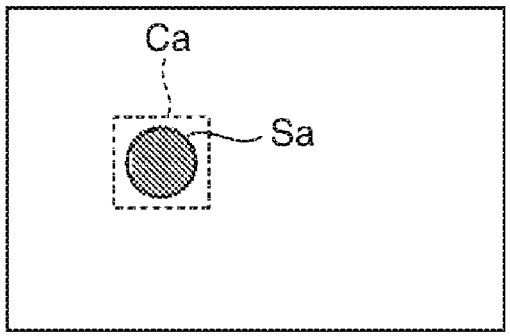
FIG. 21 illustrates a modified example of the first and second embodiments.

FIGS. 20 and 21 illustrate modified examples of the above embodiments.

For example, a cylindrical area containing the shadow area Sa may be established as the correction area Ca as illustrated in FIG. 20.

Alternatively, a rectangular area containing the shadow area Sa may be established as the correction area Ca as illustrated in FIG. 21.

The correction area Ca is not limited to a circular, cylindrical, or rectangular shape, but may be other shapes.

In the above embodiments, the number of the projectors included in the projection system 1 or 10 is two. However, this number may be three or larger.

In the above embodiments, the composed projection image is formed by stacking the entire areas of the respective projection images projected on the projection surface Ss from the respective projectors 5 or 50. However, the composed projection image may be formed by stacking at least a part of each area.

In the above embodiments, the respective projectors 5 or 50 (transmitting and receiving units 522) are connected by the not-shown signal line. However, information may be transmitted and received between the respective projectors 5 or 50 via wireless medium (such as radio waves, sound, and infrared light).

The reference image pickup device 2 and the respective detection image pickup devices 3 may be disposed at positions different from the positions according to the above embodiments.

In the above embodiments, the reference image pickup device 2 and the respective detection image pickup device 3 include CCD. However, these components may include other types of image pickup elements such as MOS sensor. In case of the structure using CCD, a single-plate CCD, or three-plate CCD having red light CCD for detecting red light, green light CCD for detecting green light, and blue light CCD for detecting blue light may be used.

In the above embodiments, the shadow area judging units 5242 and 52420 calculate the theoretical sum of the reference image binary data and the detection image binary data containing two values of "0" for pixels having small luminance value and "1" for pixels having large luminance value for each pair of corresponding pixels to create the judging image data. Then, the shadow area judging units 5242 and 52420 judge the area having pixels of "0" as the shadow area based on the judging image data. However, the shadow area may be judged by the following method.

The shadow area judging unit produces reference image binary data and detection image binary data containing two values of "1" for pixels having small luminance value and "0" for pixels having large luminance value. Then, the shadow area judging unit calculates the theoretical product of the reference image binary data and the detection image binary data for each pair of corresponding pixels to create judging image data containing two values of "1" for each pair of corresponding pixels which are both "1", and "0" for each pair of corresponding pixels either or both of which are "0". Then, the shadow area judging unit judges the area having pixels of "1" as the shadow area based on the judging image data.

The equation (1) used in the above embodiments may be other expressions.

While the transmission-type liquid crystal panel (liquid crystal light valves 512) is used in the first embodiment, a reflection-type liquid crystal panel may be used.

While the liquid crystal light valves 512 have three liquid crystal light valves in the first embodiment, the number of the liquid crystal light valves may be one, two, four or larger.

While each of the protectors 50 has the color wheel 514 in the second embodiment, three LEDs for emitting red, green and blue light, respectively, may be used as the light source unit 511. In this case, images of the respective colors are displayed by turning on or off the respective LEDs with time-sharing system.

In the above embodiments, the projection systems 1 and 10 are of front projection type which uses a reflection type screen as the screen Sc and projects image light onto the screen Sc from the audience side. However, the projection systems 1 and 10 may be of rear projection type which uses a transmission type screen as the screen Sc and projects image light onto the screen Sc from the side opposite to the audience side (back side of screen Sc).

While there has been illustrated and described what are considered to be preferred embodiments of the invention, the invention should not be limited to these embodiments. Accordingly, while specific embodiments are chiefly depicted and described, various modifications and changes in shapes, materials, numbers and other detailed structures may be given to these embodiments by those skilled in the art without departing from the technical spirit and scope of the invention.

As obvious, any descriptions for limiting shapes, materials and the like in the embodiments are only examples which may be helpful for easy understanding of the invention, and do not limit the scope of the invention. It is therefore understood that any descriptions containing components with names from which a part or all of the limitations in shapes, materials and the like are removed are included in the scope of the invention.

The image correcting apparatus according to an aspect of the invention prevents degradation of a composed projection image caused by shadow generated on a part of the composed projection image due to the presence of an obstacle by the image correction by the projector. Thus, the image correcting apparatus is applicable to a projection system used for the purpose of presentation or other purposes.

What is claimed is:

1. An image correcting apparatus used in a projection system which includes a plurality of projectors installed away from each other, each of which projectors modulates light emitted from a light source according to image information, and projects the modulated image on a projection surface to display a projection image, the respective projection images projected by the plural projectors being stacked to display a composed projection image on the projection surface, and the projectors correcting the image by operation of the image correcting apparatus, and the image correcting apparatus comprising:

a reference image pickup device disposed at a chief audience position for observing the composed projection image to obtain an image of the projection surface on which the composed projection image is displayed and output a reference image;

a plurality of detection image pickup devices each of which is disposed close to the corresponding one of the plural projectors to obtain an image of the projection surface in the same direction as the projection direction of the corresponding projector and output a detection image; and a correction control device which controls operations of the reference image pickup device and the plural detection image pickup devices, wherein the correction control device includes a plurality of shadow area judging units each of which is provided on the corresponding one of the plural projectors and judges a shadow area generated on a projection image projected by the projector other than the correction target projector of the plural projectors and displayed on the projection surface based on a detection image obtained by the detection image pickup device disposed close to the correction target projector as a target of image correction and a reference image obtained by the reference image pickup device, and a plurality of shadow correction parameter producing units each of which is provided on the corresponding one of the plural projectors and gives weights to the shadow area and the non-shadow area other than the shadow area to produce shadow correction parameter containing luminance correction weight information based on which the correction target projector corrects luminance of areas corresponding to the shadow area and the non-shadow area in the image according to the weights.

2. The image correcting apparatus according to claim 1, wherein the shadow area judging unit includes:
- a reference image binary data producing section which produces reference image binary data containing two values for large luminance and small luminance for each pixel in the reference image;
- a detection image binary data producing section which produces detection image binary data containing two values for large luminance and small luminance for each pixel in the detection image; and
- an area judging section which calculates the theoretical sum or theoretical product of the reference image binary data and the detection image binary data for each pair of corresponding pixels and produces judging image data for judging the shadow area to judge the shadow area based on the judging image data.

3. The image correcting apparatus according to claim 1, wherein the shadow correction parameter producing unit establishes an area containing the shadow area as a correction area and an area other than the correction area as the non-shadow area, and gradually changes the weight of a correction shadow area other than the shadow area in the correction area from the weight of the shadow area to the weight of the non-shadow area as the position of the weight shifts from the shadow area to the non-shadow area to produce shadow correction parameter containing the luminance correction weight information for correcting luminance of the areas corresponding to the shadow area, the correction shadow area, and the non-shadow area.

4. The image correcting apparatus according to claim 1, wherein the shadow correction parameter producing unit includes:
- a luminance correction weight information producing section which produces the luminance correction weight information;
- a luminance complementary weight information producing section which produces luminance complementary weight information obtained by reversing the luminance correction weight information on the basis of the weight of the non-shadow area; and
- a weight information combining section which combines the luminance complementary weight information produced by the luminance complementary weight information producing section of the other shadow correction parameter producing unit and the luminance correction weight information produced by the luminance correction weight information producing section of the shadow correction parameter producing unit to create the shadow correction parameter.

5. The image correcting apparatus according to claim 1, wherein:
- a plurality of invisible light emitting devices each of which is disposed close to the corresponding one of the plural projectors to emit light in an invisible region toward the projection surface in the same direction as the projection direction of an image from the corresponding projector are provided; and
- the reference image pickup device and the plural detection image pickup devices detect light emitted from the invisible light emitting devices and reflected by the projection surface.

6. The image correcting apparatus according to claim 1, wherein:
- the plural projectors are projectors capable of switching images of red, green and blue with time-sharing system, and displaying images of different colors for each projector in a monochromatic display period for displaying monochromatic image;
- the shadow area judging unit includes
  - a reference image dividing section which divides a reference image obtained by the reference image pickup device in the monochromatic display period in synchronization with display timing of each of the projectors for displaying the respective colors,
  - a reference difference image producing section which calculates the difference between the reference image divided by the reference image dividing section and an image corresponding to the display color displayed by the correction target projector in the monochromatic display period and creates reference difference image,
  - a detection image dividing section which divides a detection image obtained by the detection image pickup device disposed close to the correction target projector in the monochromatic display period in synchronization with display timing of each of the projectors for displaying the respective colors, and
  - a detection difference image producing section which calculates the difference between the detection image divided by the detection image dividing section and an image corresponding to the display color displayed by the correction target projector in the monochromatic display period and creates detection difference image; and
- the shadow area judging unit judges a shadow area generated on a projection image projected by any of the plural projectors other than the correction target projector and displayed on the projection surface based on the reference difference image and the detection difference image.

7. The image correcting apparatus according to claim 6, wherein:
- the shadow area judging unit includes
  - a reference image integrating section which sequentially acquires reference images obtained by the reference image pickup device and integrates pixel values in the acquired reference images for each corresponding pixel, and
  - a detection image integrating section which sequentially acquires detection images obtained by the detection image pickup device disposed close to the correction target projector and integrates pixel values in the acquired detection images for each corresponding pixel;
- the reference image dividing section divides a reference image integrated in the monochromatic display period in synchronization with the display timing of each of the projectors for displaying respective colors from reference images integrated by the reference image integrating section; and
- the detection image dividing section divides a detection image integrated in the monochromatic display period in synchronization with the display timing of each of the projectors for displaying respective colors from detection images integrated by the detection image integrating section.

8. A projection system, comprising:
a plurality of projectors each of which modulates light emitted from a light source to form an image, and projects the image to display a projection image on a projection surface, the respective projection images projected by the plural projectors being stacked to display a composed projection image on the projection surface; and
the image correcting apparatus according to claim 1.

9. An image correcting method used in a projection system which includes a plurality of projectors installed away from each other, each of which projectors modulates light emitted from a light source according to image information, and projects the modulated image on a projection surface to display a projection image, the respective projection images projected by the plural projectors being stacked to display a composed projection image on the projection surface, the projectors correcting the image by the image correcting method using an image correcting apparatus, the image correcting apparatus including:
a reference image pickup device disposed at a chief audience position for observing the composed projection image to obtain an image of the projection surface on which the composed projection image is displayed and output a reference image;
a plurality of detection image pickup devices each of which is disposed close to the corresponding one of the plural projectors to obtain an image of the projection surface in the same direction as the projection direction of the corresponding projector and output a detection image; and
a correction control device which controls operations of the reference image pickup device and the plural detection image pickup devices,
wherein the correction control device performs
a shadow area judging step for judging a shadow area generated on a projection image projected by the projector other than the correction target projector of the plural projectors and displayed on the projection surface based on a detection image obtained by the detection image pickup device disposed close to the correction target projector as a target of image correction and a reference image obtained by the reference image pickup device, and
a shadow correction parameter producing step for giving weights to the shadow area and the non-shadow area other than the shadow area to produce shadow correction parameter containing luminance correction weight information based on which the correction target projector corrects luminance of areas corresponding to the shadow area and the non-shadow area in the image according to the weights.

10. A non-transitory computer readable medium with an image correcting program used in a projection system which includes a plurality of projectors installed away from each other, each of which projectors modulates light emitted from a light source according to image information, and projects the modulated image on a projection surface to display a projection image, the respective projection images projected by the plural projectors being stacked to display a composed projection image on the projection surface, and the projectors correcting the image using an image correcting apparatus operated under the image correcting program,
the image correcting apparatus including:
a reference image pickup device disposed at a chief audience position for observing the composed projection image to obtain an image of the projection surface on which the composed projection image is displayed and output a reference image;
a plurality of detection image pickup devices each of which is disposed close to the corresponding one of the plural projectors to obtain an image of the projection surface in the same direction as the projection direction of the corresponding projector and output a detection image; and
a correction control device which controls operations of the reference image pickup device and the plural detect ion image pickup devices,
wherein the correction control device performs
a shadow area judging step for judging a shadow area generated on a projection image projected by the projector other than the correction target projector of the plural projectors and displayed on the projection surface based on a detection image obtained by the detection image pickup device disposed close to the correction target projector as a target of image correction and a reference image obtained by the reference image pickup device, and
a shadow correction parameter producing step for giving weights to the shadow area and the non-shadow area other than the shadow area to produce shadow correction parameter containing luminance correction weight information based on which the correction target projector corrects luminance of areas corresponding to the shadow area and the non-shadow area in the image according to the weights.

* * * * *